United States Patent
Ijpeij et al.

(10) Patent No.: US 7,956,140 B2
(45) Date of Patent: Jun. 7, 2011

(54) POLYMERIZATION CATALYST COMPRISING AMIDINE LIGAND

(75) Inventors: Edwin Ijpeij, Sittard (NL); Henricus Arts, Munstergeleen (NL); Gerardus van Doremaele, Sittard (NL); Peter Windmuller, Landgraaf (NL); Francis Van der Burgt, Herten (NL); Martin Alexander Zuideveld, Maastricht (NL)

(73) Assignee: DSM IP Assets B.V., Te Heerlen (NL)

( * ) Notice: Subject to any disclaimer, the term of this patent is extended or adjusted under 35 U.S.C. 154(b) by 979 days.

(21) Appl. No.: 10/592,861

(22) PCT Filed: Mar. 14, 2005

(86) PCT No.: PCT/EP2005/002812
§ 371 (c)(1),
(2), (4) Date: Dec. 6, 2006

(87) PCT Pub. No.: WO2005/090418
PCT Pub. Date: Sep. 29, 2005

(65) Prior Publication Data
US 2009/0012246 A1    Jan. 8, 2009

Related U.S. Application Data

(60) Provisional application No. 60/556,057, filed on Mar. 25, 2004.

(30) Foreign Application Priority Data

Mar. 17, 2004  (EP) ..................................... 04075854

(51) Int. Cl.
*C08F 4/44*    (2006.01)

(52) U.S. Cl. ....................................................... 526/160
(58) Field of Classification Search ................... 526/160
See application file for complete search history.

(56) References Cited

U.S. PATENT DOCUMENTS

| 6,420,300 B1 | 7/2002 | McMeeking et al. |
| 2002/0103073 A1 | 8/2002 | Hoang et al. |

FOREIGN PATENT DOCUMENTS

| EP | 1 162 214 | 12/2001 |
| JP | 11-236409 | 8/1999 |
| JP | 11-236410 | 8/1999 |
| WO | 03/059968 | 7/2003 |

OTHER PUBLICATIONS

International Search Report.
G. Chandra et al; "Amido-derivatives of Metals and Metalloids. Part X.[1] Reactions of Titanium(IV), Zirconium(IV) and Hafnium(IV) Amides with Unsaturated Substrates, and Some Related Experiments with Amides of Boron, Silicon, Germanium, and Tin(IV)"; Journal of the Chemical Society, Section A: Inorganic, Physical and Theoretical Chemistry, Chemical Soceity, Letchworth, GB, vol. 15, 1970, pp. 2550-2558.
Guilhem Rousselet et al; "Cooper(I)-Induced Addition of Amines to Unactivated Nitriles: The First General One-Step Synthesis of Alkyl Amidines"; Tetrahedron Letters, vol. 34, No. 40, Oct. 1, 1993.

*Primary Examiner* — Ling-Siu Choi
*Assistant Examiner* — Sonya Wright
(74) *Attorney, Agent, or Firm* — Nixon & Vanderhye P.C.

(57) ABSTRACT

The invention relates to a process for the preparation of a polymer comprising at least one aliphatic or aromatic hydrocarbyl $C_{2-20}$ olefin in the presence of an ionic catalyst, comprising an organometallic compound and an activator, and optionally a scavenger.

10 Claims, 5 Drawing Sheets

POLYMERIZATION CATALYST COMPRISING AMIDINE LIGAND

This application is the US national phase of international application PCT/EP2005/002812 filed 14 Mar. 2005 which designated the U.S. and claims benefit of EP 04075854.2 and U.S. 60/556,057, dated 17 Mar. 2004 and 25 Mar. 2004, respectively, the entire content of which is hereby incorporated by reference.

The invention relates to a process for the preparation of a polymer comprising at least one aliphatic or aromatic hydrocarbyl $C_{2-20}$ olefin in the presence of an ionic catalyst comprising an organometallic compound, an activator and optionally a scavenger. The invention further relates to a new catalyst, a method for the preparation of this catalyst and polymers prepared with the process of the invention.

A process for the preparation of a polymer comprising at least one aliphatic or aromatic hydrocarbyl $C_{2-20}$ olefin in the presence of a catalyst, an activator, and optionally a scavenger is known from U.S. Pat. No. 6,114,481. U.S. Pat. No. 6,114,481 discloses a process for the copolymerization of ethylene and at least one additional alpha olefin having from 3 to 8 carbon atoms characterized in that said process employs a catalyst system for olefin polymerization comprising:

an organometallic complex of a group 4 metal; and
an activator.

A disadvantage of this known process is the relatively low activity of the catalyst. The aim of the current invention is to provide a process for the preparation of a polymer with a catalyst having a higher activity than the catalyst in the known process.

This aim is achieved in that the organometallic compound is a compound according to formula 1:

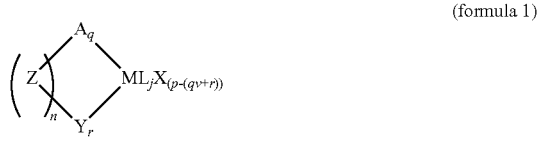

(formula 1)

where:

M is a metal of group 3-13 or the lanthanide series, and p is the valency of the metal M;

A represents a neutral or anionic spectator ligand whose valency v is 0, 1 or 2 and q is an integer denoting the number of spectator ligands A;

Z is an optional bridging moiety, and n is the integer number of parallel bridging moieties Z; Y is an amidine-containing spectator ligand represented by formula 2:

(formula 2)

wherein the amidine-containing ligand is covalently bonded to the metal M via the imine nitrogen atom, and $Sub_1$ is a substituent comprising a group 14 atom through which $Sub_1$ is bonded to the imine carbon atom. $Sub_2$ is a substituent comprising a heteroatom of group 15-16, through which $Sub_2$ is bonded to the imine carbon atom;

r is an integer >0;
L is an optional neutral Lewis basic ligand, and j is an integer denoting the number of neutral ligands L; and
X is an anionic ligand.

In the process of the invention the activity of the catalyst is significantly higher than in the known process. An additional advantage is that the catalyst used in the process of the invention can be manufactured at lower costs than the catalyst used in the known process.

Processes for the preparation of a polymer of at least one aliphatic or aromatic hydrocarbyl $C_{2-20}$ olefin are fairly well known in the art. These processes are generally conducted by contacting at least one olefinic monomer with a catalyst and optionally a scavenger in the gas phase or in the presence of an inert hydrocarbon solvent. Suitable solvents are a $C_{5-12}$ hydrocarbon which may be substituted by a $C_{1-4}$ alkyl group, such as pentane, hexane, heptane, octane, isomers and mixtures thereof, cyclohexane, methylcyclohexane, pentamethyl heptane and hydrogenated naphtha. The process of the invention may be conducted at temperatures from about 20° C. to about 250° C., depending on the product being made.

An olefinic monomer is understood to be a molecule containing at least one polymerizable double bond.

Suitable olefinic monomers are $C_{2-20}$ olefins. Preferred monomers include ethylene and $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, and $C_{4-12}$ straight chained or cyclic hydrocarbyl radicals which are unsubstituted or substituted by a $C_{1-4}$ alkyl radical. Illustrative non-limiting examples of such α-olefins are propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These α-olefins may be used in combination.

The monomer may also be a polyene comprising at least two double bonds. The double bonds may be conjugated or non-conjugated in chains, ring systems or combinations thereof, and they may be endocyclic and/or exocyclic and may have different amounts and types of substituents. This means that the polyene may comprise at least one aliphatic, alicyclic or aromatic group, or combinations thereof.

Suitable polyenes include aliphatic polyenes and alicyclic polyenes. More specifically, aliphatic polyenes can be mentioned, such as 1,4-hexadiene, 3-methyl-1,4-hexadiene, 4-methyl-1,4-hexadiene, 5-methyl-1,4-hexadiene, 4-ethyl-1,4-hexadiene, 1,5-hexadiene, 3-methyl-1,5-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 1,6-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 1,6-octadiene, 6-methyl-1,6-octadiene, 7-methyl-1,6-octadiene, 6-ethyl-1,6-octadiene, 6-propyl-1,6-octadiene, 6-butyl-1,6-octadiene, 1,7-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1, 7-nonadiene, 1,8-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-methyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 1,9-decadiene, 1,5,9-decatriene, 6-methyl-1,6-undecadiene, 9-methyl-1,8-undecadiene and 1,13-tetradecadiene, 1,3-butadiene, isoprene.

Alicyclic polyenes may consist of at least one cyclic fragment. Examples of these alicyclic polyenes are vinylcyclohexene, vinylnorbornene, ethylidene norbornene, dicyclopentadiene, cyclooctadiene, 2,5-norbornadiene, 1,4-divinylcyclohexane, 1,3-divinylcyclohexane, 1,3-divinylcyclopentane, 1,5-divinylcyclooctane, 1-allyl-4-vinylcyclohexane, 1,4-diallylcyclohexane, 1-allyl-5-vinylcyclooctane, 1,5-diallylcyclooctane, 1-allyl-4-isopropenylcyclohexane, 1-isopropenyl-4-vinylcyclohexane and 1-isopropenyl-3-vinylcyclopentane, and 1,4-cyclohexadiene. Preferred polyenes are polyenes having at least one endocyclic double bond and optionally at least one exocyclic double bond, such as 5-methylene-2-norbornene and 5-ethylidene-2-norbornene, 5-vinylnorbornene, and 2,5-norbornadiene, dicyclopentadiene, vinylcyclohexene and the like.

Examples of aromatic polyenes are divinylbenzene (including its isomers), trivinylbenzene (including its isomers) and vinylisopropenylbenzene (including its isomers).

All of the above-mentioned monomers may be further substituted with at least one group comprising a heteroatom of group 13-17, or combinations thereof.

Homopolymers, copolymers and terpolymers of the above-mentioned olefinic monomers and blends thereof can be prepared with the process of the present invention.

The ionic catalyst used in the process of the invention comprises an organometallic compound and an activator. The metal (M) in the organometallic compound of formula 1 represents an atom of group 3-13 or the lanthanide series. Preferably, the metal is chosen from group 3, 4, 5, 6 or 7, or the lanthanide series, more preferably from group 4-7. Even more preferably, the metal is chosen from Group 4. Most preferably, the metal is Ti.

In the organometallic compound used in the process of the invention, A is a neutral or anionic spectator ligand, and q is an integer denoting the number of spectator ligands A. The valency v of A is 0, 1, or 2. Examples of monoanions are carbanions, silylanions, germylanions, amides, phosphides, imines, and chalconides. Examples of dianionic ligands are biphenoxides, cyclooctatetraenides, boroles and the like.

The spectator ligand A is preferably an imine ligand, a chalconide, or a cyclopentadienyl-containing ligand.

An imine ligand is defined as a group containing a double bonded nitrogen atom. Examples of imine ligands are ketimine, guanidine, phosphinimine, iminoimidazolidine, (hetero)aryloxyimines, pyrroleimines, indoleimines, imidazoleimines or (hetero)aryloxides, (substituted) pyridin-2-yl-methoxy, (substituted) quinolin-2-yl-methoxy, 8-hydroxyquinoline, 8-aminoquinoline, 8-phosphinoquinoline, 8-thioquinoline, 8-hydroxyquinaldine, 8-aminoquinaldine, 8-phosphinoquinaldine, 8-thioquinaldine and 7-azaindole or indazole and the like.

A cyclopentadienyl-containing ligand comprises at least one cyclopentadienyl (Cp) ring. This ring may be substituted with at least one R' group. When the Cp ring is substituted with at least two R' groups, these R' groups may form at least one ring system. As result, the Cp-containing ligand may be an indenyl or fluorenyl group.

The R' groups may each independently be hydrogen or a hydrocarbon radical with 1-20 carbon atoms (e.g. alkyl, aryl, biaryl, aralkyl, alkaryl and the like) or a heteroatom comprising a moiety from group 13-17. Examples of such hydrocarbon radicals are methyl, ethyl, n-propyl, i-propyl, butyl (including isomers), hexyl (including isomers), decyl (including isomers), phenyl, biphenyl (including isomers) and the like. Examples of heteroatom-containing moieties of group 13-17 are borane radicals, silyl radicals, germyl radicals, stannyl radicals, amide radicals, phosphide radicals, oxide radicals, sulphide radicals, halide radicals, halide substituted hydrocarbyl radicals and the like. Also, two adjacent hydrocarbon radicals may be connected with each other resulting in a ring system. Such a group may also contain one or more R' groups as substituents. R' may also be a substituent which instead of or in addition to carbon and/or hydrogen may comprise one or more heteroatoms of groups 13-17.

Suitable ligands A are (substituted) cyclopentadienyl groups, (substituted) indenyl groups, (substituted) fluorenyl groups, (substituted) tetrahydroindenyl groups, (substituted) tetrahydrofluorenyl groups, (substituted) octahydrofluorenyl groups, (substituted) benzoindenyl groups, (substituted) heterocyclopentadienyl groups, (substituted) heteroindenyl groups, (substituted) heterofluorenyl groups, or their isomers. A heterocyclopentadienyl group (hereinafter referred to as 'hetero ligand') is understood to be a group that has been derived from a cyclopentadienyl group, but in which at least one of the C atoms in the 5-ring of the cyclopentadienyl has been replaced by a hetero atom, which heteroatom may be chosen from group 14, 15 or 16. If there is more than one heteroatom present in the 5-ring of the hetero ligand, these heteroatoms may be the same or different. More preferably, the heteroatom is chosen from group 15, while yet more preferably the heteroatom is phosphorus.

If ligand A is a neutral ligand, this ligand may be as defined under L.

In the organometallic compound used in the process of the invention Z is an optional bridging moiety, and n is the integer number of parallel bridging moieties Z. In case of n=0, there is no bridge between A and Y. The optional bridging group Z may contain $sp^3$, $sp^2$ or sp hybridized atoms of group 13 to 16 or combinations thereof. The bridging group Z may consist of linear, cyclic fragments, Spiro ring systems, or combinations thereof. Examples of a carbon containing Z group may be a hydrocarbon group with 1-20 carbon atoms, e.g. alkylidene, arylidene, biarylene, aryl alkylidene, etc. Examples of such groups are methylene, ethylene, propylene, butylene, phenylene, naphthylene, biphenylene, binaphthylene. Examples of silicon-containing groups are dimethylsilyl, diethylsilyl, dipropylsilyl, including its isomers, (substituted) diphenylsilyl, dimethoxysilyl, diethoxysilyl, dipropoxysilyl, and diphenoxysilyl.

In the organometallic compound used in the process of the invention Y is an amidine-containing spectator ligand, and r is an integer with r>0. An amidine-containing spectator ligand is a ligand that is represented by formula 2. The amidine-containing ligand is covalently bonded to the metal via the imine nitrogen atom. This means that the imine nitrogen atom of the imine does not have any substituents but the imine carbon atom. $Sub_1$ comprises a group 14 atom through which $Sub_1$ is bonded to the imine carbon atom. $Sub_2$ comprises a heteroatom of group 15-16, through which $Sub_2$ is bonded to the imine carbon atom. Preferably this atom is selected from the group of nitrogen, phosphorus, oxygen or sulfur. $Sub_1$ preferably represents a hydrocarbyl radical, optionally substituted with heteroatoms of group 13-17, or a silyl radical, optionally substituted with group 13-17 atoms.

Sub$_2$ preferably is an amide, imide, phosphide, phospinimide, oxide, sulphide radical, optionally substituted with hydrocarbyl radicals or silyl radicals as described for Sub$_1$. Sub$_1$ or Sub$_2$ may be bonded to the bridging moiety Z or may be part of a ring system, which ring system may be bonded to the bridging moiety Z.

In the organometallic compound used in the process of the invention L is optionally a neutral Lewis basic ligand, and j is an integer denoting the number of neutral ligands L. The ligand L may be present in the organometallic compound for reasons of stability. If the ligand L is present, L is an ether, a thioether, a tertiary amine, a tertiary phosphane, an imine, or a bi-, or oligodentate, comprising an ether, a thioether, a tertiary amine, or a tertiary phosphane functional group, or combinations thereof.

Suitable ethers are tetrahydrofuran and diethylether. Suitable thioethers are thiophene, diethylsulfide, and dimethylsulfide. Suitable tertiary amines are trialkylamines, pyridine, bipyridine, TMEDA, and (–)-sparteine). Suitable tertiary phosphanes are triphenylphoshine, trialkylphosphanes. Suitable of imines are ketimines, guanidines, iminoimidazolidines, phosphinimines, amidines and the like. Suitable bidentate ligands are diimines, alkyl or aryldiphoshanes, dimethoxyethane. Suitable oligodentate ligands are triimines (such as tris(pyrazolyl)alkanes), cyclic multidentate ligands comprising heteroatoms of group 13-17, including crown ethers optionally having heteroatoms of group 13-17, azo-crown ethers optionally having heteroatoms of group 13-17, phospha-crown ethers optionally having heteroatoms of group 13-17, crown ethers having combinations of heteroatoms of group 15-16 optionally having heteroatoms of group 13-17 and crown ethers containing heteroatoms of group 14-17 or combinations thereof.

In the catalyst used in the process of the invention, X is an anionic ligand. Each anionic ligand, X, bonded to M, may be independently selected from the group consisting of hydride, halide, alkyl, silyl, germyl, aryl, amide, aryloxy, alkoxy, phosphide, sulfide, acyl, pseudo halides such as cyanide, azide, and acetylacetonate, or a combination thereof. Preferably, X is a hydride or a moiety selected from the group consisting of monoanionic spectator ligands, halide, alkyl, aryl, silyl, germyl, aryloxy, alkoxy, amide, siloxy and combinations thereof (e.g. alkaryl, aralkyl, silyl substituted alkyl, silyl substituted aryl, aryloxyalkyl, aryloxyaryl, alkoxyalkyl, alkoxyaryl, amidoalkyl, amidoaryl, siloxyalkyl, siloxyaryl, amidosiloxyalkyl, haloalkyl, haloaryl, etc.) having up to 20 non-hydrogen atoms.

Preferred anionic ligands X include halides and hydrocarbyl anions. A preferred halide is chloride. In one embodiment of the invention hydrocarbyl groups are anionically charged hydrocarbyl groups. In addition to the usual definition of a hydrocarbyl group, in this application a hydrocarbyl group also comprises a hydride group. The hydrocarbyl groups optionally contain heteroatoms of group 13-17. Preferred hydrocarbyl groups include hydride, alkyl-, aryl-, aralkyl-, alkaryl-, substituted vinyl- and substituted allylgroups. More preferred hydrocarbyl groups include hydride, alkyl-, aryl-, aralkyl- and alkaryl groups. Most preferred hydrocarbyl groups include alkyl-, aryl-, aralkyl- and alkaryl groups. Examples of such most preferred hydrocarbyl groups are methyl, benzyl, methyltrimethylsilyl, phenyl, methoxyphenyl, dimethoxyphenyl, N,N-dimethylaminophenyl, bis(N,N-dimethylamino)phenyl, fluorophenyl, difluorophenyl, trifluorophenyl, tetrafluoropheny, perfluorophenyl, trialkylsilylphenyl, bis(trialkylsilyl)phenyl, tris(trialkylsilyl) phenyl and the like.

The number of ligands (X and L) depends on the valency of the metal and the stability of the organometallic compound. The organometallic compound may be monomeric, oligomeric or a cluster. The number of anionic ligands equals the valency of the metal used. The number of neutral ligands on the organometallic reagent may range from 0 to the amount that satisfies the 18-electron rule, as known in the art.

An additional advantage of the process of the invention is that extremely high molecular weight polyolefins can be prepared. This is particularly advantageous in a process for the preparation of ultrahigh molecular weight polyethylene with a weight average molecular weight of more than 400,000 g/mol (UHMWPE) and for an ethylene/α-olefin polyene copolymer or an ethylene/α-olefin/non-conjugated polyene terpolymer.

In the process of the invention the catalyst comprises an activator. Activators for single-site catalysts are fairly well known in the art. These activators often comprise a group 13 atom, such as boron or aluminium. Examples of these activators are described in *Chem. Rev.*, 2000, 100, 1391 by E. Y-X. Chen and T. J. Marks. A preferred activator is a borate, a borane or an alkylaluminoxane (e.g. methylaluminoxane (MAO)).

In the process of the invention the catalyst optionally comprises a scavenger. A scavenger is a compound that reacts with impurities present in the process of the invention, which are poisonous to the catalyst. A scavenger in an embodiment of the invention can be a hydrocarbyl of a metal or metalloid of group 1-13 or its reaction products with at least one sterically hindered compound containing a group 15 or 16 atom. Preferably, the group 15 or 16 atom of the sterically hindered compound bears a proton. Examples of these sterically hindered compounds are tert-butanol, iso-propanol, triphenyl-carbinol, 2,6-di-tert-butylphenol, 4-methyl-2,6-di-tert-butylphenol, 4-ethyl-2,6-di-tert-butylphenol, 2,6-di-tert-butylanilin, 4-methyl-2,6-di-tert-butylanilin, 4-ethyl-2,6-di-tert-butylanilin, HMDS (hexamethyldisilazane), di-isopropylamine, di-tert-butylamine, diphenylamine and the like. Some non-limiting examples of scavengers are butyl-lithium including its isomers, dihydrocarbylmagnesium, tri-hydrocarbylaluminium, such as trimethylaluminium, triethylaluminium, tripropylaluminium (including its isomers), tributylaluminium (including its isomers) tripentylaluminium (including its isomers), trihexyl aluminium (including its isomers), triheptyl aluminium (including its isomers), trioctyl aluminium (including its isomers), hydrocarbylaluminoxanes and hydrocarbylzinc and the like, and their reaction products with a sterically hindered compound or an acid, such as HF, HCl, HBr, HI.

The invention further relates to a catalyst for the preparation of a polyolefin.

Catalysts for the preparation of polyolefins are known from U.S. Pat. No. 6,114,481. In U.S. Pat. No. 6,114,481 a catalyst system is disclosed that comprises an organometallic complex containing a ketimine ligand. The disadvantage of this catalyst is its low activity in olefin polymerization. An example of a catalyst comprising a special ketimine is the iminoimidazolidine comprising catalyst described in WO-A-02070560. However, although the activity of this catalyst is improved compared to the ketimine catalyst, the preparation of iminoimidazolidine catalyst comprises more reaction steps using highly toxic cyanogen bromide, which may liberate the highly toxic hydrocyanic acid. One of the aims aim of the invention is to provide a low-cost catalyst that is highly active in olefin polymerization and avoids the use of highly toxic starting materials or intermediates.

This aim is achieved with the organometallic compound according to claim 4.

Amidinate-containing organometallic compounds of Ti are described by Zambelli et. al. in Macromolecules, 2003, 5451-5458. The difference between an amidine containing ligand, covalently bonded to the metal ion and an amidinate (both groups comprising a first and a second nitrogen atom, which in case of the amidine may also be another group 15 or 16 atom) is, that the imine nitrogen atom (the first nitrogen atom) of the amidine is unambiguously covalently bonded to the metal ion, while the second nitrogen atom has no interaction with the metal ion.

The interaction of the two nitrogen atoms of the amidinate ligand is illustrated in scheme 1 below. Scheme 1 clearly indicates that both nitrogen atoms have a bounding interaction with the metal ion (the latter is not shown in the scheme), which is comparable to the η³Pd-allyl bond as known in the art.

Scheme 1

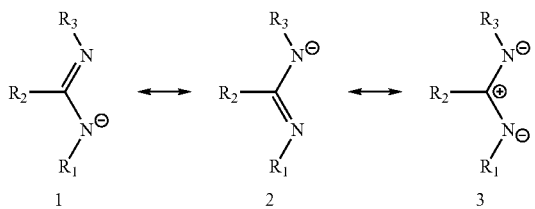

Another difference is that the imine nitrogen of amidine is formally negatively charged, while the imine nitrogen of the amidinate in the resonance structure is formally neutrally charged. In the third resonance structure of scheme 1 both nitrogen atoms are negatively charged.

A third difference is that the imine nitrogen of the amidine cannot have a substituent, while both nitrogen atoms of the amidinate have substituents.

The invention also relates to a supported catalyst which comprises a organometallic compound of formula 1, a supporting material and optionally a scavenger and/or an activator.

A supporting material is defined as an inorganic or organic compound that does not dissolve in the inert hydrocarbon solvent in which the process of the invention is carried out. Suitable inorganic supports include silica, magnesium halides, such as $MgF_2$, $MgCl_2$, $MgBr_2$, $MgI_2$, zeolites, and alumina. Suitable organic supports include polymers. Some non-limiting examples of polymeric supports are polyolefins such as polystryrene, polypropylene and polyethylene, polycondensates such as polyamides and polyesters and combinations thereof.

The invention also relates to a process for the production of the organometallic compound of formula 1. In this process a organometallic reagent of formula 3 is contacted with an amidine-containing ligand precursor according to formula 2, with $$ML_jX_p \quad \text{(formula 3)},$$

wherein M is a metal from group 3, 4, 5, 6 or 7, or a metal from the lanthanide series, and p is the valency of the metal M, L is a neutral Lewis based ligand bonded to M, and j represents an integer denoting the number of neutral ligands L, and X is an anionic ligand bonded to M.

An amidine-containing ligand precursor can be a metal salt of an amidine, an amidine, or the HB adduct of an amidine.

If a metal salt of an amidine according to formula 4 is used, the process as described above can be carried out as such, with (formula 4)

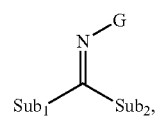

wherein $Sub_1$ and $Sub_2$ are groups as described above, and G is a group comprising a metal of group 1, 2, or 13 or a group comprising Si, Ge, Sn or Pb. If G represents a group with a metal of group 1, group G may further contain Lewis basic ligands as defined for L. If group G contains a metal of group 2, the group G contains a second anionic ligand. This anionic ligand may be another negatively charged amidine ligand or an anionic ligand as defined for X. If the group G contains an atom of group 13, this atom can further be substituted with two groups which each can be either an amidine-containing ligand or an anionic group as defined for X, or combinations thereof. If group G comprises an atom chosen from the series of Si, Ge, Sn or Pb, this atom can be substituted with three hydrocarbyl groups, optionally containing at least one hetero atom of group 13-17.

If the process is carried out with an amidine according to formula 5, or its HB adduct, (formula 5)

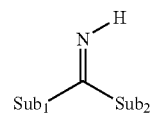

wherein $Sub_1$ and $Sub_2$ are groups as described above, the process is carried out in the presence of at least 1 equivalent of a base with respect to the organometallic reagent.

If the process is carried out with the HB adduct of an amidine-containing ligand according to formula 5, the process has to be carried out in the presence of at least two equivalents of a base. The advantage of the HB adduct of the amidine-containing ligand is that its stability towards hydrolysis is significantly higher than for the metal salt of formula 4 or the amidine of formula 5.

Methods for the preparation of amidine ligands and the metal salt thereof are well known in the art.

Some non-limiting examples of B are halides, such as fluoride, chloride, bromide, or iodide, sulfate, hydrogen sulfate, phosphate, hydrogen phosphate, dihydrogen phosphate, carbonate, hydrogen carbonate, aromatic or aliphatic carboxylates, cyanide, tetrafluoroborate, (substituted) tetraphenylborates, fluorinated tetraarylborates, alkyl or aryl sulfonates.

If the method for the preparation of the catalyst is carried out in the presence of a base, suitable bases include amines, phosphanes, carboxylates (for example potassium acetate), fluorides, hydroxides, cyanides, amides and carbonates of Li, Na, K, Rb, Cs, ammonium and the group 2 metals Mg, Ca, and Ba, the alkali metal (Li, Na, K, Rb, Cs) phosphates and the phosphate esters (eg. $C_6H_5$ OP(O)(ONa)$_2$ and related aryl and alkyl compounds) and their alkoxides and phenoxides, thallium hydroxide, alkylammonium hydroxides and fluorides. Some of these bases may be used in conjunction with a phase transfer reagent, such as tetraalkylammonium salts or crown ethers. Stronger bases may also be applied, for example carbanions such as hydrocarbanions and hydrides of group 1, group 2, group 12 or group 13 elements. The alkalimetals of group 1 may also be applied as a base. If the spectator ligand is a diacidic spectator ligand, at least two equivalents of a base are required.

Preferred bases include amines, organolithium compounds, or organomagnesium compounds, alkali metals, group 1 hydrides or group 2 hydrides.

More preferred bases are mono-, di-, or trialkylamines or aromatic amines, organolithium compounds, organomagnesium compounds, sodium hydride or calcium hydride. In this application, aromatic amines are understood to be compounds having a nitrogen atom in an aromatic ring system or mono-, di-, or triarylamines.

Even more preferred bases are triethylamine, pyridine, tripropylamine, tributylamine, 1,4-diaza-bicyclo[2.2.2]octane, pyrrolidine or piperidine organolithium compounds, or organomagnesium compounds. Examples of organomagnesium compounds are methylmagnesium halides, phenylmagnesium halides, benzylmagnesium halides, biphenylmagnesium halides, naphthylmagnesium halides, tolylmagnesium halides, xylylmagnesium halides, mesitylmagnesium halides, dimethylresorcinolmagnesium halides, N,N-dimethylanilinemagnesium halides, dimethylmagnesium, diphenylmagnesium, dibenzylmagnesium, bis(biphenyl)magnesium, dinaphtylmagnesium, ditolylmagnesium, dixylylmagnesium, dimesitylmagnesium, bis(dimethylresorcinol)magnesium and bis(N,N-dimethylaniline)magnesium.

Examples of organolithium compounds are methyllithium, phenyllithium, benzyllithium, biphenyllithium, naphthyllithium, lithio-dimethylresorcinol and lithio-N,N-dimethylaniline.

In a most preferred embodiment of the process of the invention the neutral ligand L can be the base. In this case, depending on the number of neutral ligands and the number of required equivalents of a base, there is no need, or a reduced need, for an added base. Examples of L serving as a base are mono-, bi- or multidentate amines, mono-, bi-, or multidentate phoshanes, aza or phospha-crown ethers, or combinations thereof.

In order to obtain an organometallic compound that can be activated by advanced activators, such as boron comprising activators (boranes, borates), the anionic ligand X in the organometallic compound has to be a hydrocarbyl group. The process for the preparation of the organometallic compound is therefore optionally carried out in the presence of a hydrocarbylating agent. In this application, hydrocarbylating agents are understood to be nucleophilic groups comprising a metal-carbon bond, a metalloid-carbon bond or a metal or metalloid hydride bond. The number of equivalents required for a process for the preparation of a hydrocarbylated organometallic compound is at least the number of the anionic ligands X that has to be replaced by a hydrocarbylating agent. Suitable hydrocarbylating agents are tri- or tetrahydrocarbyl boron, tri- or tetrahydrocarbyl aluminium, tri- or tetrahydrocarbyl gallium, tri- or tetrahydrocarbyl indium and di- or tetrahydrocarbyl tin, or the reaction products of these hydrocarbylating agents with sterically hindered alcohols, thiols, amines or phosphanes.

Preferably the hydrocarbylating agent comprises a metal or a metalloid chosen from group 1, 2, 11, 12, 13 or 14. Examples of hydrides from metals or metalloids of group 1, 2, 11, 12, 13, 14 are lithium hydride, sodium hydride, potassium hydride, calcium hydride, magnesium hydride, copper hydride, zinc hydride, cadmium hydride, borane, aluminum hydride, gallium hydride, silicon hydride, germanium hydride and tin hydride.

More preferably the hydrocarbylating agent comprises Li, Mg, Zn, or Al.

Examples of Li-containing hydrocarbylating agents are methyllithium, phenyllithium, benzyllithium, biphenyllithium, naphtyllithium, lithio-dimethylresorcinol, and lithio-N,N-dimethylaniline.

Examples of magnesium-containing hydrocarbylating agents are methylmagnesium halide, phenylmagnesium halide, benzylmagnesium halide, biphenylmagnesium halide, naphtylmagnesium halide, tolylmagnesium halide, xylylmagnesium halide, mesitylmagnesium halide, dimethylresorcinolmagnesium halide, N,N-dimethylanilinemagnesium halide, dimethylmagnesium, diphenylmagnesium, dibenzylmagnesium, (biphenylene)magnesium, dinaphtylmagnesium, ditolylmagnesium, dixylylmagnesium, dimesitylmagnesium, bis(dimethylresorcinol)magnesium and bis(N,N-dimethylaniline)magnesium.

Examples of aluminium-containing hydrocarbylating agents are diisobutylaluminium hydride, $C_1$-$C_{20}$ trihydrocarbyl aluminium, and hydrocarbyl aluminoxanes.

The process for the preparation of the organometallic compound according to the invention is preferably carried out in a solvent. Suitable solvents are solvents that do not react with the organometallic reagent or the organometallic compound formed in the process of the invention. Examples of suitable solvents are aromatic and aliphatic hydrocarbons, halogenated hydrocarbons, amides of the aliphatic carboxylic acids and primary or secondary amines, DMSO, nitromethane, acetone, acetonitrile, benzonitrile, ethers, polyethers, cyclic ethers, lower aromatic and aliphatic ethers, esters, pyridine, alkylpyridines, cyclic and primary or secondary amines, and mixtures thereof. Preferred solvents include aromatic or aliphatic hydrocarbons or mixtures thereof.

The process for the preparation of the catalyst according to the invention is carried out by contacting an amidine-containing ligand with an organometallic reagent of formula 3. The desired organometallic compound is often formed instantaneously. Excess of a base may be applied without negative effects on the reaction product.

During the reaction, a salt is formed. The reaction mixture as obtained by contacting an amidine-containing ligand with an organometallic reagent according to formula 3 can be used as a catalyst in a polyolefin polymerization without an additional filtration step if the salt formed during the reaction is compatible with the polymerisation process. If a salt free organometallic compound is required, the salt can be removed by filtration. Depending on the solubility of the organometallic compound, the mixture may be heated and then filtered. An advantage of the present invention is that the filtrate may be used as such without further purification in a following process, such as a hydrocarbylation step or a polymerization process. If desired, the organometallic compound may be isolated by distillation of the solvent, by precipitation or by crystallization from a suitable solvent.

Preferably, the process of the invention is carried out in the presence of a boron-containing or aluminium-containing cocatalyst in the presence of a catalyst according to the invention, which is formed in situ in the polymerization equipment.

The invention further relates to polymers obtainable with the catalyst of the invention.

FIGURES

Figure 1:
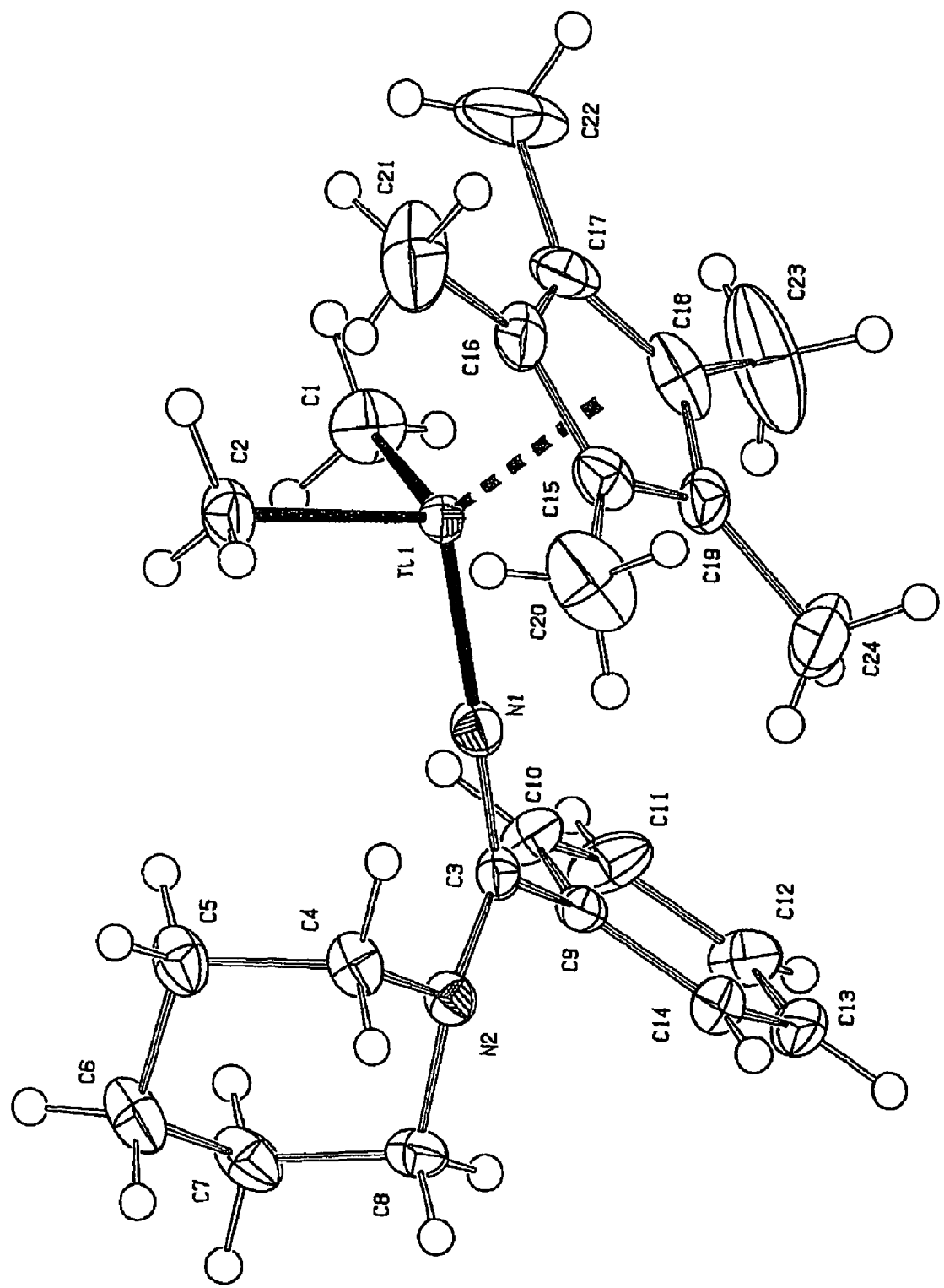
FIG. 1 shows the X-ray structure of $Me_5CpTiMe_2(NC(Ph)(C_5H_{10}N)$.

The invention is further illustrated by the following examples.

Test Methods.

Size Exclusion Chromatography (SEC) coupled to Refractive Index (RI) and Differential Viscometry (DV) detection (SEC-DV)

Equipment: PL220 (Polymer Laboratories) SEC with PL220 DR1 concentration detector and Viscotek 220R viscometry detector.

Detectors are operated in parallel configuration.

Erma solvent degasser ERC-3522

Data processing: Viscotek data processing software, TriSEC 2.7 or higher version Columns: Toyo Soda (TSK) GMHHR-H(S) HT mixed bed (4×)

Calibration: Universal calibration with linear polyethylene (PE) standard (molecular weight 0.4-4000 kg/mol)

Temperature: 145° C.

Flow: 1.0 ml/min

Injection volume: 0.300 ml

Solvent/eluent: Distilled 1,2,4-trichlorobenzene with about 1 g/l of Ionol stabilizer Sample preparation: Dissolving for 4 hours at approx. 150° C.

Filtration through 1.2 micron Ag filter

Sample concentration approx. 1.0 mg/ml

SEC-MALLS was measured with a PL-GPC210 with Wyatt DAWN EOS; 2 PL 20 u mixed A columns; Software: Wyatt Astra 4.90;

Eluent: 1,2,4-trichlorobenzene at 160° C.

Intrinsic Viscosity (IV) was measured at 135° C. in decahydronaphtalen as solvent.

NMR ($^1$H, 300 MHz, $^{13}$C 75.7 MHz, and $^{19}$F at 282 MHz) spectra were measures on a Bruker Avance 300 spectrometer.

Fourier transformation infrared spectroscopy (FT-IR), was used to determine the composition of the copolymers according to the method that is known in the art. The FT-IR measurement gives the composition of the various monomers in weight per cents relative to the total composition.

The Mooney viscosity (ML(1+4) 125° C.) and Mooney Stress Relaxation (MSR) were measured according to ISO 289 on a Monsanto Mooney MV2000E.

Part I: Synthesis of Ligands and Compounds

General.

All experiments were carried out under nitrogen using Schlenk line techniques. Diethylether an n-hexane were dried by distillation from sodium potassium alloy using benzophenone ketyl as indicator. Toluene was dried by distillation from sodium using benzophenone ketyl as indicator. All other reagents were used as received without further purification.

Synthesis of Compound for the Comparative Experiments

Comparative Compound I-A (Me$_5$CpTiCl$_2$(NC(tert-Bu$_2$)) and Comparative Compound I-B (Me$_5$CpTiMe$_2$(NC(tert-Bu$_2$)) were prepared as described in U.S. Pat. No. 6,114,481.

Comparative Compound II (Me$_2$SiC$_5$Me$_4$(N-t-Bu)TiMe$_2$) was purchased from Boulder.

Comparative Compound III (CpTiCl$_2$((Me$_2$N)$_3$P=N)) was prepared as described in Example XI of WO-A-2005/014664.

Comparative compound IV (1,3-bis(2,6-diisopropylphenyl)-iminoimidazoline cyclopentadienyl titanium dimethyl) was prepared as described in Example IV of WO 2005/014663

Synthesis of Me$_5$CpTiCl$_2$(NC(Ph)(C$_5$H$_{10}$N) (Compound 1)

A solution of benzylmagnesium chloride (21.1 mL, 1.0 M, 21.1. mmol) in diethylether was slowly added to a solution of piperidine (1.79 g, 21.1 mmol) in diethylether (40 mL). After the addition, the reaction mixture was refluxed for 1.5 hours and allowed to cool to room temperature subsequently. Next, benzonitrile (2.17 g, 21.1 mmol) was added to the white suspension resulting in a yellow suspension, which was stirred for 16 hours. The mixture was cooled to −70° C. and a solution of Me$_5$CpTiCl$_3$ (6.10 g, 21.1 mmol) in toluene (40 mL) was added. The solvents were removed in vacuo and the residue was extracted with toluene (40 mL) twice. The solvent was removed in vacuo and the yellow/orange residue was rinsed three times with n-hexane (20 mL) resulting in a pure yellow powder (8.20 g, 88%). This powder was characterized by $^1$H NMR (300 MHz) (CDCl$_3$) δ (ppm): 7.5 (m, 2H), 7.3 (m, 3H), 3.5 (bs, 4H), 1.9 (s, 15H), 1.6 (bs, 6H) and by $^{13}$C-NMR (75.5 MHz) (CDCl$_3$) δ (ppm) 163.9 134.6, 129.5, 128.4, 128.2, 48.0 (bs), 46.0 (bs), 26.1 (bs), 24.1, 12.9.

Synthesis of Me$_5$CpTiMe$_2$(NC(Ph)(C$_5$H$_{10}$N) (Compound 2)

A solution of MeMgBr in diethylether (9.7 mL, 3.0 M, 29.1 mmol) was added to a suspension of Me$_5$CpTiCl$_2$(NC(Ph)(C$_5$H$_{10}$N) (6.40 g, 14.4 mmol) in diethylether at −70° C. After the addition, the mixture was allowed to warm to room temperature and stirred for 16 hours. The ether was removed in vacuo and the resulting yellow solid was extracted with n-hexane twice (20 mL). Single crystals of pure product (3.65 g, 63%) were obtained by cooling the filtrate to −20° C. These crystals were characterized by $^1$H NMR (300 MHz) (CDCl$_3$) δ (ppm): 7.5 (m, 2H), 7.4 (m, 3H), 3.6 (m, 4H), 1.8 (s, 15H), 1.7 (m, 6H), 0.1 (s, 6H) and by $^{13}$C-NMR (75.5 MHz) (CDCl$_3$) δ (ppm): 159.8, 138.4, 128.3, 127.9. 127.5, 119.4, 59.9, 47.4 (bs), 44.3, 26.9, 26.3, 24.9, 12.0, 11.5. The X-ray structure is shown in FIG. 1.

Synthesis of IndTiCl$_2$(NC(Ph)(C$_5$H$_{10}$N) Toluene Adduct (Compound 3)

Benzylmagnesiumchloride (4.0 mL, 1.0M, 4.0 mmol) was added to a solution of piperidine (0.34 g, 4.0 mmol) in diethylether (40 mL) The mixture was heated to reflux for 1 h. Next, benzonitrile (0.42 g, 4.1 mmol) was added at room temperature. After stirring for 16 h, toluene (20 mL) and IndTiCl$_3$ (1.08 g, 4.0 mmol) were added at −78° C. and the mixture was allowed to warm to room temperature. After 16 h, the solvents were removed under reduced pressure and the product was extracted with toluene (2×20 mL). n-Hexane (40 mL) was added and the product was crystallised at −20° C., resulting in 1.21 g (59%) crystals. These crystals were characterized by $^1$H NMR (300 MHz) (CDCl$_3$) δ (ppm): 7.0-7.5 (m, 14H), 3.7 (m, 2H), 3.2 (bs, 2H), 2.3, (s, 3H), 1.6 (m, 6H).

Synthesis of the Ligand 2-(2,6-dimethyl-phenyl)-2,3-dihydro-isoindol-1-ylideneamine hydrobromide 2,6-dimethylaniline (6.2 g, 51 mmol) was added to a solution of 2-cyanobenzylbromide (10.0 g, 51 mmol) in toluene (250 ml). The solution was heated to reflux for 18 hours. The formed solid was filtered off and washed with toluene (2×25 ml). After drying 11.5 g of the desired compound was obtained as a white solid. The filtrate was heated to reflux for 20 hours. Another 1.5 g of pure product was obtained leading to a total yield of 13.0 g (80%). The product was characterized by $^1$H NMR (300 MHz) (CDCl$_3$) δ (ppm): 11.1 (bs, 1H), 9.1 (d, 1H), 7.7 (m, 3H), 7.6 (t, 1H), 7.3 (dd, 1H), 7.2 (dd, 2H), 4.9 (s, 2H), 2.1 (s, 6H) and by $^{13}$C NMR (75 MHz) (CDCl$_3$) δ (ppm): 162.9, 141.8, 136.3, 134.7, 131.5, 131.4, 130.4, 129.7, 127.6, 127.5 123.7, 57.8, 18.0.

Synthesis CpTiCl$_2$(C$_{16}$H$_{15}$N$_2$) Compound 4)

CpTiCl$_3$ (1.1 g, 5.0 mmol) and 2-(2,6-dimethyl-phenyl)-2,3-dihydro-isoindol-1-ylideneamine hydrobromide (1.6 g, 5.0 mmol) were suspended in toluene (50 ml). Triethylamine (1.5 mL) was added and the reaction mixture was stirred at room temperature for 18 hours. The solids were filtered off and the solvent was removed in vacuo from the filtrate. The solid was extracted once with toluene (80 ml). The extract was added to the first fraction of product and the solvent was removed in vacuo leaving 0.82 g (39%) of a dark red powder. These crystals were characterized by $^1$H NMR (300 MHz) (CDCl$_3$) δ (ppm): 7.9 (d, 1H), 7.6 (t, 1H), 7.5 (t, 2H), 7.2 (t, 1H), 7.1 (d, 2H), 6.2 (s, 5H), 4.7 (s, 2H), 2.3 (s, 6H) and by $^{13}$C NMR (75 MHz) (CDCl$_3$) δ (ppm): 139.2, 134.7, 133.4, 131.5, 130.2, 127.2, 126.9, 126.6, 123.8, 120.7, 117.1, 113.9, 52.4, 16.1.

Synthesis of CpMe$_5$TiCl$_2$(C$_{16}$H$_{15}$N$_2$) (Compound 11)

Me$_5$CpTiCl$_3$ (1.1 g, 3.8 mmol) and 2-(2,6-dimethyl-phenyl)-2,3-dihydro-isoindol-1-ylideneamine hydrobromide (1.1 g, 3.5 mmol) were suspended in toluene (40 mL). Triethylamine (2.0 ml) was added and the reaction mixture was stirred at room temperature for 18 hours. The reaction mixture was heated and filtered. From the filtrate, a small amount of solvent (10 mL) was evaporated and the remaining solution was stored at −20° C. The liquid was decanted from the obtained crystals. The crystals were dried yielding 0.23 g (14%). These crystals were characterized by $^1$H NMR (300 MHz) (CDCl$_3$) δ (ppm): 7.8 (d, 1H), 7.5 (m, 3H), 7.1 (m, 3H), 4.7 (s, 2H), 2.3 (s, 6H), 1.9 (s, 15H) and by $^{13}$C NMR 75 MHz (CDCl$_3$) δ (ppm): 160.7, 140.9, 137.3, 136.3, 134.9, 131.8, 129.1, 129.0, 128.9, 128.2, 125.6, 123.1, 54.2, 19.0, 13.3.

Synthesis of the Ligand
N,N-diisopropylbenzamidine

A solution of MeMgBr in ether (50.0 mL, 3.0 M, 0.15 mol) was added to a solution of diisopropylamine (16.17 g, 0.16 mol) in toluene (250 mL) at 50° C. The mixture was stirred for 1.5 h and a white precipitate formed. Next, the mixture was cooled to 0° C. and benzonitrile (15.4 g, 0.15 mol) was added. The mixture was allowed to warm to room temperature and stirred for 16 h subsequently. The conversion, determined by GC, appeared to be 90%. The mixture was quenched with water (100 mL). The organic phase was separated from the aqueous phase and the latter was extracted with diethylether (50 mL) twice. The combined organic phases were dried over Na$_2$SO$_4$, filtered and the solvents were removed under reduced pressure. The crude product was distilled at 145° C. at reduced pressure (0.52 mbar) resulting in 15.3 g (50%) of pure product. The ligand was characterized by $^1$H NMR (300 MHz) (CDCl$_3$) δ (ppm): 7.2 (m, 5H), 5.7 (bs, 1H), 3.5 (p, 2H), 1.2 (d, 12H) and by $^{13}$C-NMR (75.5 MHz) (CDCl$_3$) δ (ppm) 168.4, 141.8, 128.8, 128.5, 126.2, 48.6, 21.2.

Synthesis of CpTiCl$_2$NC(Ph)($^i$Pr$_2$N) (Compound 5)

Figure 2:
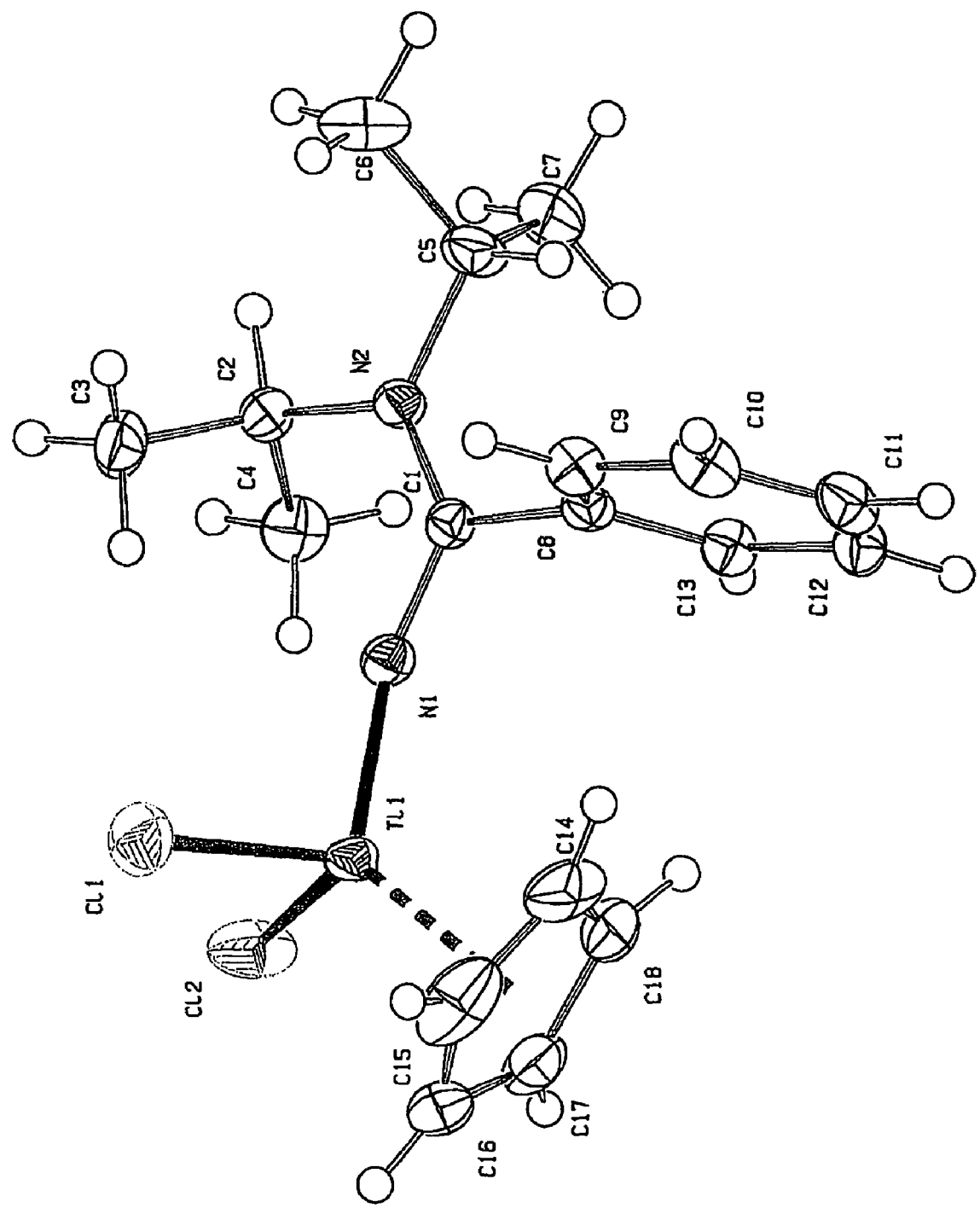
FIG. 2 shows the X-ray structure of $CpTiCl_2(NC(Ph)(^iPr_2N)$.

Toluene (50 mL) was added to a mixture of CpTiCl$_3$ (1.03 g, 4.7 mmol) and N,N-diisopropylbenzamidine (0.95 g, 4.7 mmol). Et$_3$N (2.5 mL, 1.83 g, 18.1 mmol) was added to the resulting bright orange suspension and the mixture was stirred for 64 h. $^1$H-NMR showed 100% conversion to the desired complex, without any detectable amounts of by-products. The mixture was filtered and the product was crystallised from this solution at −20° C., resulting in 0.98 g (53%) single crystals. These crystals were characterized by $^1$H NMR (300 MHz) (CDCl$_3$) δ (ppm): 7.4 (m, 3H), 7.2 (m, 2H), 6.1 (s, 5H), 3.6 (bd, 2H), 1.6 (bs, 6H), 1.1 (bs, 6H) and by $^{13}$C-NMR (75.5 MHz) (CDCl$_3$) δ (ppm) 166.9, 138.4, 129.8, 129.4, 126.1, 116.0, 53.4 (bs), 49.2 (bs), 20.7 (bs). The X-ray structure is given in FIG. 2.

Synthesis of Me$_5$CpTiCl$_2$(NC(Ph)($^i$Pr$_2$N) (Compound 6)

Et$_3$N (2.5 mL, 1.83 g, 18.1 mmol) was added to a suspension of Me$_5$CpTiCl$_3$ (1.45 g, 5.0 mmol) and N,N-diisopropylbenzamidine (1.00 g, 4.9 mmol) in toluene (50 mL). The mixture was stirred for 16 h. $^1$H-NMR showed 100% conversion to the desired complex, without any detectable amounts of by-products. The mixture was filtered, the residue rinsed with n-hexane and the product was crystallised from this solution at −20° C., giving 1.20 g (54%) crystals. The product was characterized by $^1$H NMR (300 MHz) (CDCl$_3$) δ (ppm): 7.3 (m, 5H), 3.7 (bs, 2H), 1.8 (s, 15H), 1.5 (bs, 6H), 1.1 (bs, 6H) and by $^{13}$C-NMR (75.5 MHz) (CDCl$_3$) δ (ppm) 165.5, 138.1, 129.0, 128.7, 127.2, 52.5 (bs), 48.3 (bs), 21.1 (bs), 12.9.

Synthesis of the Ligand
N,N-diisopropyl-2,6-difluoro-benzamidine

A solution of EtMgBr in ether (8.0 mL, 3.0 M, 24 mmol) was added to a solution of diisopropylamine (2.50 g, 24.8 mmol) in toluene (60 mL) at 50° C. The mixture was stirred for 1 h and a white precipitate formed. Next, the mixture was cooled to 0° C. and 2,6-difluorobenzonitrile (3.34 g, 24 mmol) was added. The mixture was allowed to warm to room temperature and stirred for 16 h subsequently. The conversion, determined by GC, appeared to be 98%. The mixture was quenched with an aqueous NH$_4$Cl solution (1%, 100 mL). The organic phase was separated from the aqueous phase and the latter was extracted with diethylether (200 mL) twice. The combined organic phases were dried over Na$_2$SO$_4$, filtered and the solvents were removed under reduced pressure giving 5.40 g (91%) of pure product. The ligand was characterized by $^1$H NMR (300 MHz) (CDCl$_3$) δ (ppm): 7.2 (m, 1H), 6.8 (m, 2H), 5.5 (bs, 1H), 3.7 (bs, 1H), 3.4 (bs, 1H), 1.5 (bs, 6H), 1.0 (bs, 6H), by $^{13}$C NMR 75 MHz (CDCl$_3$) δ (ppm): 158.9 (dd, J=248 Hz, J=8 Hz), 155.7, 130.1, 130.0, 129.8, 112.1, 112.0, 111.9, 111.852.0 (bs), 46.2 (bs), 21.3, 20.5 and by $^{19}$F (282 MHz) (CDCl$_3$) δ (ppm) −114.

Synthesis of CpTiCl$_2$(NC(2,6-F$_2$Ph)($^i$Pr$_2$N) (Compound 7)

Et$_3$N (2.00 mL, 1.44 g, 14.3 mmol) was added to a mixture of CpTiCl$_3$ (1.00 g, 4.56 mmol) and N,N-diisopropyl-2,6-difluorobenzamidine (1.09 g, 4.56 mmol) in toluene (60 mL).

A precipitate was formed immediately and the yellow-orange mixture was stirred for 64 h subsequently. The mixture was filtered at 80° C. and the product was crystallised from this solution at 4° C., resulting in 1.40 g (73%) single crystals. The product was characterized by $^1$H NMR (300 MHz) (CDCl$_3$) δ (ppm): 7.4 (m, 1H), 7.0 (m, 2H), 6.26 (s, 5H), 3.6 (m, 2H), 1.6 (d, 6H), 1.1 (d, 6H), by $^{13}$C-NMR (75.5 MHz) (CDCl$_3$) δ (ppm) 158.2 (dd, J=250 Hz and J=8 Hz), 155.1, 131.3 (t, J=9 Hz), 116.4, 115.2 (t, J=23 Hz), 112.4 (m), 54.1, 49.4, 20.8 and by $^{19}$F (282 MHz) (CDCl$_3$) δ (ppm) −114.

Figure 3:
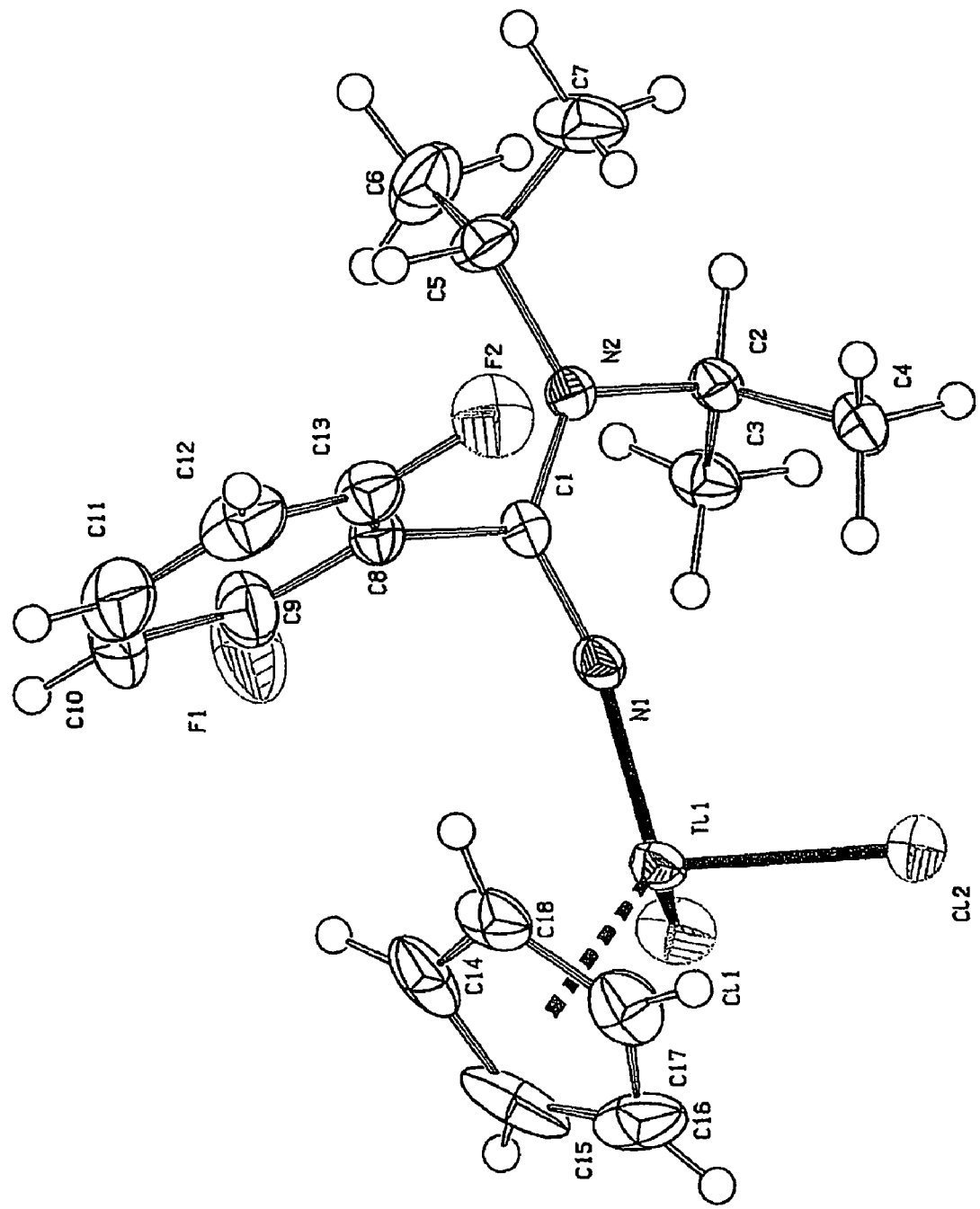
FIG. 3 shows the X-ray structure CpTiCl$_2$(NC(2,6-F$_2$Ph)($^i$Pr$_2$N).

The X-ray structure is depicted in FIG. 3.

Synthesis of TMSCpTiCl$_2$(NC(2,6-F$_2$Ph)($^i$Pr$_2$N) (Compound 8)

TMSCpTiCl$_3$ was prepared as described in J. C. S., Dalton Trans., 1980, 1156.

Et$_3$N (2.0 mL, 1.44 g, 14.3 mmol) was added to a mixture of TMSCpTiCl$_3$ (1.21 g, 4.17 mmol) and N,N-diisopropyl-2,6-difluorobenzamidine (1.00 g, 4.17 mmol) in toluene (60 mL) A precipitate was formed immediately and the red mixture was stirred for 64 h subsequently. The mixture was filtered and the solvents were removed under reduced pressure. The product was precipitated from n-hexane at 4° C., resulting in 1.08 g (52%) of an orange powder. The product was characterized by $^1$H NMR (300 MHz) (CDCl$_3$) δ (ppm): 7.3 (m, 1H), 6.9 (m, 2H), 6.3 (m, 2H), 6.1 (m, 2H), 3.5 (m, 2H), 1.6 (d, 6H), 1.1 (d, 6H) 0.1 (s, 9H), by $^{13}$C-NMR (75.5 MHz) (CDCl$_3$) δ (ppm) 158.4 (dd, J=250 Hz and J=8 Hz), 154.7, 131.3 (t, J=10 Hz), 130.5, 123.8, 117.8, 115.5, 112.5 (m), 54.2, 49.5, 21.0, 0.0 and by $^{19}$F (282 MHz) (CDCl$_3$) δ (ppm) −114.

Synthesis of MeCpTiCl$_2$(NC(2,6-F$_2$Ph)($^i$Pr$_2$N) (Compound 10)

Me$_5$CpTiCl$_3$ (7.24 g, 25 mmol) and N,N-diisopropyl-2,6-difluorobenzamidine (6.05 g, 25.2 mmol) were dissolved in toluene (150 mL). Next, triethylamine (4.0 mL, 2.9 g, 29 mmol) was added and the reaction mixture was stirred for 18 hours. The reaction mixture was filtered and the residue was rinsed once with toluene (60 mL). The solvent of the combined organic phases was removed in vacuo. The residue was triturated with hexane (60 mL) once resulting in 12.18 g (99%) orange powder. These crystals were characterized by $^1$H NMR (300 MHz) (CDCl$_3$) δ (ppm): 7.2 (pent, 1H), 6.9 (dd, 2H), 3.8 (bs, 1H) 3.6 (sept, 1H), 2.0 (s, 15H), 1.5 (d, 6H), 1.1 (d, 6H) and by $^{13}$C-NMR (75.5 MHz) (CDCl$_3$) δ (ppm) 157.1 (dd, J=250 Hz and J=8 Hz), 152.3, 129.3 (t, J=10 Hz), 126.4, 113.6 (t, J=23 Hz), 110.8 (m), 51.4 (bs), 47.3, 19.5, 19.3, 12.0.

Synthesis of Me$_5$CpTiMe$_2$(NC(2,6-F$_2$Ph)($^i$Pr$_2$N) (Compound 10M)

A solution of methylmagnesiumbromide (16.5 mL, 3.0M solution in diethylether, 49.5 mmol) was added to a solution of Me$_5$CpTiCl$_2$(NC(2,6-F$_2$Ph)($^i$Pr$_2$N) (12.18 g, 24.7 mmol) in toluene (100 mL) at −78° C. The reaction mixture was stirred at room temperature for 18 hours. The reaction mixture was filtered and the solvent from the filtrate was removed in vacuo. The residue was triturated with hexane (100 mL) resulting in 10.9 g of pure product as a yellow powder (97%). These crystals were characterized by $^1$H NMR (300 MHz) (CDCl$_3$) δ (ppm): 7.8 (d pent, 1H), 7.0 (dd, 2H), 4.0 (bs, 1H) 3.8 (sept, 1H), 1.9 (s, 15H), 1.8 (d, 6H), 1.3 (d, 6H), 0.0 (s, 6H) and by $^{13}$C-NMR (75.5 MHz) (CDCl$_3$) δ (ppm): 157.3 (dd, J=248 Hz and J=8 Hz), 146.5, 127.1 (t, J=10 Hz), 118.7, 117.2 (t, J=25 Hz), 110.3 (m), 50.5, 47.1, 45.9, 20.1, 19.4, 10.3.

Synthesis of the Ligand C-anthracen-9-yl-C-piperidin-1-yl-methyleneamine (piperidinoanthramidine)

A solution of MeMgBr in ether (3.3 mL, 3.0 M, 9.9 mmol) was added to a solution of piperidine (1.11 g, 13.1 mmol) in toluene (50 mL) at 50° C. The mixture was stirred for 1 h and a white precipitate formed. Next, the mixture was cooled to 0° C. and 9-cyanoantracene (2.00 g, 9.9 mmol) was added. The mixture was allowed to warm to room temperature and the mixture was stirred for 16 h subsequently. The conversion, determined by GC, appeared to be 98%. The mixture was quenched with an aqueous NH$_4$Cl solution (1%, 150 mL). The organic phase was separated from the aqueous phase and the latter was extracted with CH$_2$Cl$_2$ (250 mL) twice. The combined organic phases were dried over Na$_2$SO$_4$, filtered and the solvents were removed under reduced pressure resulting in a sticky residue. Pure product 1.76 g (62%) was obtained by rinsing the residue with ligroin. The ligand was characterized by $^1$H NMR (300 MHz) (CDCl$_3$) δ (ppm): 8.4 (s, 1H), 7.9 (m, 4H), 7.4 (m, 4H), 5.8 (bs, 1H), 4.0 (bt, 2H), 2.7 (bt, 2H), 1.8 (bm, 2H), 1.5 (p, 2H), 1.2 (bm, 2H) and by $^{13}$C-NMR (75.5 MHz) (CDCl$_3$) δ (ppm): 163.3, 130.7, 129.4, 126.6, 125.8, 125.3, 124.6, 123.8, 123.5, 46.5, 41.8, 25.0, 23.8, 22.8.

Synthesis of CpTiCl$_2$(NC(anthracene)(C$_5$H$_{10}$N) Compound 9)

Et$_3$N (2.00 mL, 1.44 g, 14.3 mmol) was added to a mixture of CpTiCl$_3$ (0.62 g, 2.8 mmol) and piperidinoanthramidine (0.82 g, 2.8 mmol) in toluene (50 mL) and the mixture was stirred for 16 h subsequently. The mixture was filtered at 80° C. and the solvent was removed under reduced pressure. The product was crystallised from hot toluene, resulting in 0.83 g (63%) small yellow-orange crystals. The product was characterized by $^1$H NMR (300 MHz) (CDCl$_3$) δ (ppm): 8.5 (s, 1H), 8.0 (d, 4H), 7.7 (t, 2H), 7.6 (t, 2H), 7.4 (t, 2H), 5.9 (s, 5H), 4.2 (m, 2H), 2.9 (m, 2H), 1.9 (m, 2H), 1.6 (m, 2H), 1.3 (m, 2H) and by $^{13}$C-NMR (75.5 MHz) (CDCl$_3$) δ (ppm) 162.8, 131.5, 129.3, 128.9, 127.9, 126.4, 125.1, 116.1, 49.4, 47.6, 27.4, 26.9, 24.5.

Synthesis of the Ligand N,N-diisopropyl-2,6-dichloro-benzamidine

A solution of MeMgBr in ether (10 mL, 3.0 M, 30 mmol) was added to a solution of diisopropylamine (3.38 g, 33.5 mmol) in toluene (50 mL) at 50° C. The mixture was stirred for 1 h and a white precipitate formed. Next, the mixture was cooled to 0° C. and 2,6-dichlorobenzonitrile (5.0 g, 29 mmol) was added. The mixture was allowed to warm to room temperature and the mixture was stirred for 16 h subsequently. The conversion, determined by GC, appeared to be 100%. The mixture was quenched with an aqueous NH$_4$Cl solution (1%, 150 mL). The organic phase was separated from the aqueous phase and the latter was extracted with CH$_2$Cl$_2$ (250 mL) twice. The combined organic phases were dried over Na$_2$SO$_4$, filtered and the solvents were removed under reduced pressure resulting in a sticky residue. Pure product 2.50 g (31%) was obtained by rinsing the residue with ligroin. A second portion of pure ligand (5.20 g (65%)) was obtained by evaporating the solvent slowly. Total yield: 7.70 g (97%). The ligand was characterized by $^1$H NMR (300 MHz)

(CDCl$_3$) δ (ppm): 7.3 (m, 2H), 7.1 (m, 1H), 3.6 (p, 1H), 3.2 (p, 1H), 1.6 (d, 6H), 1.1 (d, 6H) and by $^{13}$C-NMR (75.5 MHz) (CDCl$_3$) δ (ppm) 160.7, 138.5, 132.7, 129.5, 128.6, 52.7, 46.2, 21.5, 20.2.

Synthesis of CpTiCl$_2$((2,6-Cl$_2$Ph)($^i$Pr$_2$N)C=N) (Compound 13)

Figure 4A:
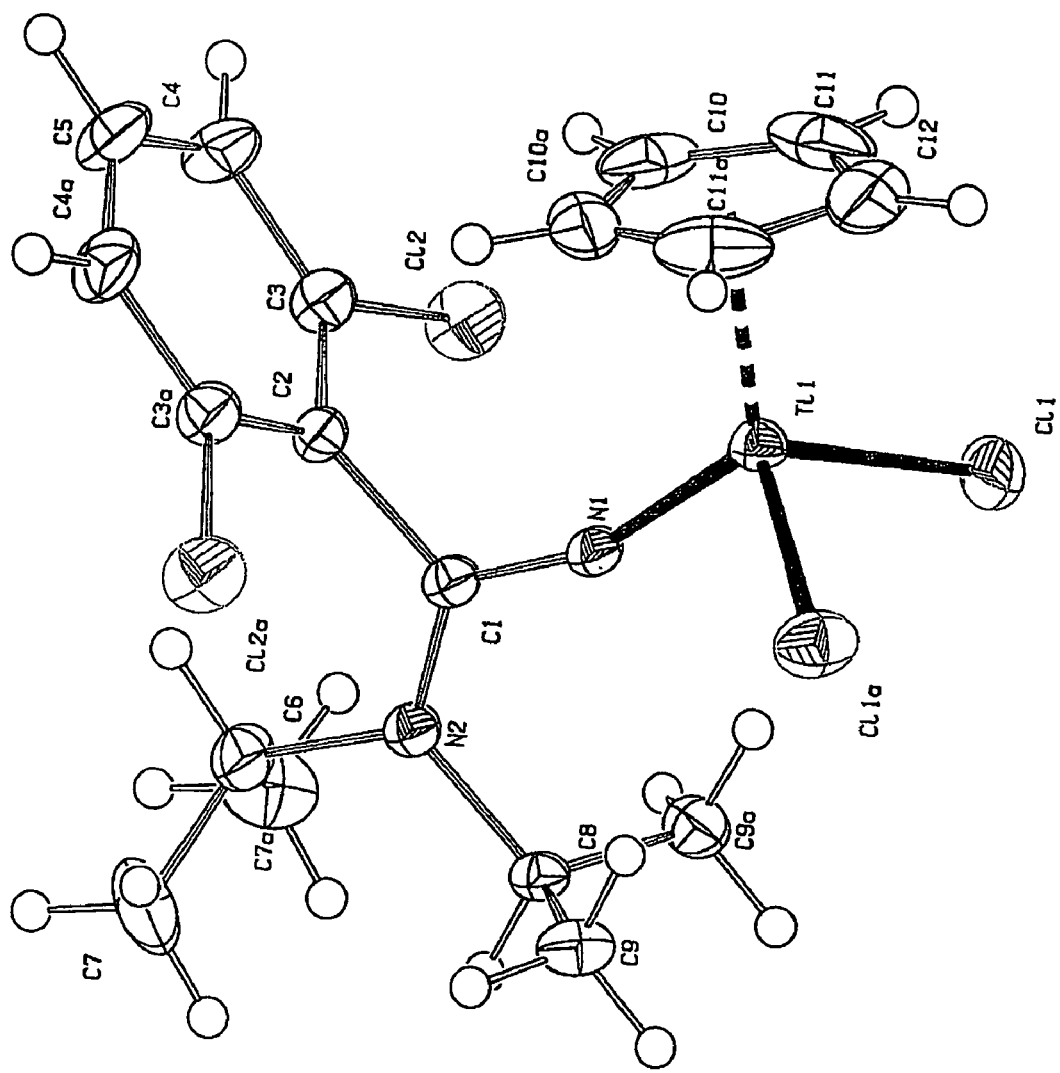
FIG. 4a shows the X-ray structure of CpTiCl$_2$(NC(2,6-Cl$_2$Ph)($^i$Pr$_2$N) in a first projection.
Figure 4B:
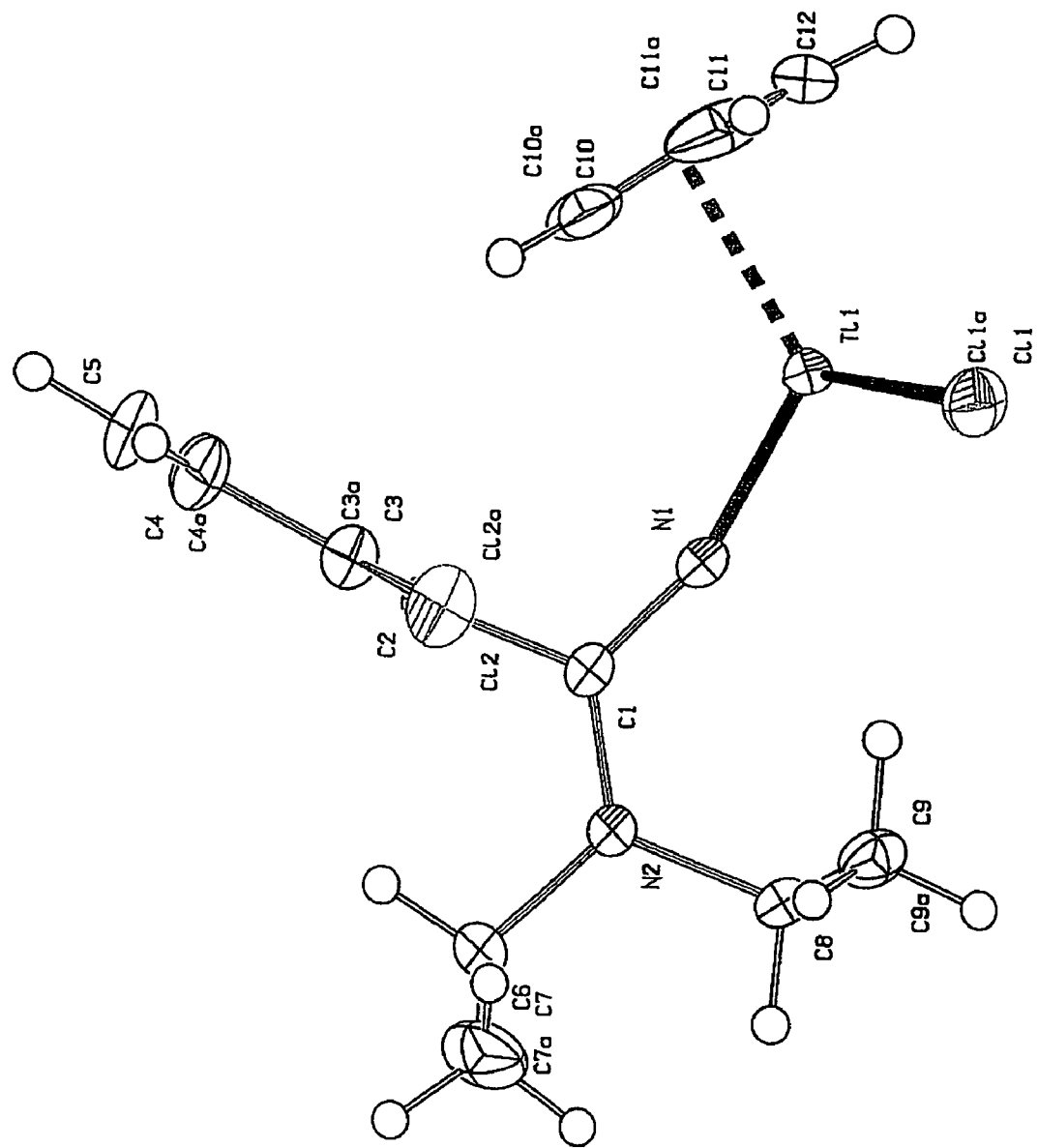
FIG. 4b shows the X-ray structure of CpTiCl$_2$(NC(2,6-Cl$_2$Ph)($^i$Pr$_2$N) in a second projection.

Et$_3$N (2.5 mL, 1.8 g, 18 mmol) was added to a mixture of CpTiCl$_3$ (0.92 g, 4.2 mmol) and N,N-diisopropyl-2,6-dichlorobenzamidine (1.15 g, 4.2 mmol) in toluene (60 mL). The mixture was stirred for 16 h subsequently. The mixture was filtered at 100° C. and the product was crystallised from this solution at −20° C., resulting in 1.15 g (61%) red single crystals. The product was characterized by $^1$H NMR (300 MHz) (CDCl$_3$) δ (ppm): 7.3 (m, 2H), 7.2 (m, 1H), 6.3 (s, 5H), 3.6 (p, 1H), 3.4 (p, 1H), 1.7 (d, 6H), 1.2 (d, 6H) and by $^{13}$C-NMR (75.5 MHz) (CDCl$_3$) δ (ppm) 161.4, 135.0, 130.7, 128.9, 116.4, 54.2, 49.4, 21.1, 20.7. The X-ray structure is given in the FIGS. 4A and 4B. FIG. 4B clearly shows that the nitrogen atom N2 has no interaction with the Ti atom.

Synthesis of Compound Me$_5$CpTiCl$_2$((2,6-Cl$_2$Ph)($^i$Pr$_2$N)C=N) (Compound 12)

Me$_5$CpTiCl$_3$ (1.0 g, 3.5 mmol) and the ligand (0.94 g, 3.5 mmol) were dissolved in toluene (40 mL). Triethylamine (2 mL) was added and the reaction mixture was stirred at room temperature for 18 hours. The reaction mixture was heated and filtered to remove solids. From the filtrate, a small amount of solvent (10 mL) was evaporated in vacuo. The resulting solution was stored at −20° C. for crystallization. The solution was decanted and the crystals were dried in vacuo. The crystallisation was repeated twice to obtain 0.33 g (18%) of pure product. These crystals were characterized by $^1$H NMR (300 MHz) (CDCl$_3$) δ (ppm): 7.2 (d, 1H), 7.1 (dd, 2H), 3.7 (m, 1H) 3.5 (sept, 1H), 2.0 (s, 15H), 1.6 (d, 6H), 1.2 (d, 6H).

Synthesis of the Ligand N-(2,6-dimethyl-phenyl)-N-ethyl-anthracene-9-carboxamidine Acetaldehyde (10 g, 0.23 mol) and molsieves ware subsequently added to a solution of 2,6-dimethylaniline (25.0 g, 0.21 mol) in degassed diethylether (250 mL). After 16 hours, the conversion (by GC) appeared to be 64%. The mixture was filtered and the solvent was removed in vacuo, resulting in 28.2 g residue. This residue was dissolved in degassed ether (250 mL) and acetaldehyde (20 g, 0.45 mol) and molsieves were added. After stirring for 5 h, the conversion appeared to be 96% (GC). The mixture was filtered, dried from Na$_2$SO$_4$, filtered. The solvent was removed in vacuo giving 29.2 g (96%) pure imine, being a mixture of Z and E isomers.

The imine was dissolved in a mixture of THF (150 mL) and MeOH (150 mL) and cooled to 0° C. To the solution was added NaBH$_4$ (15.2 g, 0.40 mol) portion wise. The reaction was exothermal and gas formation was clearly observed. After the addition, the mixture was allowed to warm to room temperature. The reaction was still exothermal and the temperature increased to 40° C. The mixture was carefully quenched with water when room temperature was reached. The organic solvents were removed under reduced pressure and the residue subsequently extracted with ether (3×150 mL). The combined organic phases were dried from Na$_2$SO$_4$, filtered and the ether was removed in vacuo. Pure N-ethyl-2,6-dimethylaniline (25.7 g, 90%) was obtained after short path distillation.

A solution of MeMgBr (4.5 mL, 3.0 M in ether, 13.5 mmol) was added to a solution of N-ethyl-2,6-dimethylaniline (2.04 g, 13.7 mmol) in toluene (50 mL) The mixture was heated to 50° C. subsequently. After stirring for 1 h, the mixture was cooled to 0° C. and 9-cyanoanthracene (2.74 g, 13.7 mmol) was added. The mixture was stirred for 16 h at room temperature. The colour of the mixture was dark green. The mixture was quenched with water and the product was extracted with ether (3×100 mL). The combined organic phases were dried from Na$_2$SO$_4$, filtered and the solvent was removed at reduced pressure. The crude product was further purified by trituration with ligroin/ether (4:1). The product was dried resulting in 2.50 g (53%). The product was characterized by $^1$H NMR (300 MHz) (CDCl$_3$) δ (ppm): 8.5 (s, 1H), 8.4 (d, 2H), 8.1 (d, 2H), 7.6 (p, 4H), 7.3 (s, 3H), 5.7 (vbs, 1H), 3.1 (q, 2H), 2.7 (s, 6H), 0.70 (t, 3H) and by $^{13}$C-NMR (75.5 MHz) (CDCl$_3$) δ (ppm) 164.1, 137.6, 131.8, 129.9, 129.3, 129.1, 128.2, 128.1, 126.8, 126.7, 126.4, 125.9, 125.7, 46.7, 20.0, 14.6.

Synthesis of CpTiCl$_2$((anthracyl)(Et(2,6-Me$_2$Ph)N)C=N) (Compound 14)

Et$_3$N (2.5 mL, 1.8 g, 18 mmol) was added to a mixture of CpTiCl$_3$ (0.75 g, 3.4 mmol) and N-(2,6-dimethyl-phenyl)-N-ethyl-anthracene-9-carboxamidine (1.20 g, 3.4 mmol) in toluene (50 mL). The mixture was stirred for 16 h subsequently. The mixture was filtered at 100° C. and the product was crystallised from this solution at −20° C., resulting in 1.24 g (68%) crystals.

The product was characterized by $^1$H NMR (300 MHz) (CDCl$_3$) δ (ppm): 8.5 (d, 3H), 8.0 (d, 2H), 7.7 (t, 2H), 7.5 (t, 2H), 7.2 (m, 5H), 6.0 (s, 5H), 3.1 (q, 2H), 2.7 (s, 6H), 0.7 (t, 3H) and by $^{13}$C-NMR (75.5 MHz) (CDCl$_3$) δ (ppm) 168.0, 136.14, 131.7, 129.9, 129.5, 129.4, 129.0, 128.6, 127.6, 126.2, 125.4, 116.1, 47.9, 20.4, 13.8.

Synthesis of the Ligand N,N-diisopropyl-o-toluamidine

A solution of MeMgBr in ether (12.9 mL, 3.0 M, 38.7 mmol) was added to a solution of diisopropylamine (3.91 g, 38.7 mmol) in toluene (60 mL) at 50° C. The mixture was stirred for 1 h and a white precipitate formed. Next, the mixture was cooled to 0° C. and tolunitrile (4.53 g, 38.7 mmol) was added. The mixture was allowed to warm to room temperature and stirred for 16 h subsequently. The mixture was quenched with water (100 mL). The organic phase was separated from the aqueous phase and the latter was extracted with diethylether (150 mL) twice. The combined organic phases were dried over Na$_2$SO$_4$, filtered and the solvents were removed under reduced pressure giving a sticky residue. This residue was triturated with ligroin giving 4.40 g (52%) pure product.

The ligand was characterized by $^1$H NMR (300 MHz) (CDCl$_3$) δ (ppm): 7.1 (m, 4H), 5.6 (bs, 1H), 3.5 (bs, 2H), 2.2 (s, 3H), 1.3 (bd, 12H) and by $^{13}$C-NMR (75.5 MHz) (CDCl$_3$) δ (ppm): 167.1, 141.1, 133.9, 130.6, 128.0, 126.2, 21.2 (bs), 19.3.

Synthesis of CpTiCl$_2$((o-tolyl)($^i$Pr$_2$N)C=N) (Compound 21)

Et$_3$N (2.7 mL, 2.0 g, 20 mmol) was added to a mixture of CpTiCl$_3$ (3.61 g, 16.5 mmol) and N,N-diisopropyltoluamidine (3.59 g, 16.5 mmol) in toluene (80 mL). The mixture was stirred for 16 h subsequently. The mixture was filtered at 100°

C. and the product was crystallised from this solution at room temperature, resulting in a first fraction of 1.90 g (29%) crystals after filtration. The solvent of the filtrate was removed under reduced pressure resulting in a second fraction of 4.67 g (70%) orange powder. The $^1$H NMR and $^{13}$C-NMR spectra of both fractions were identical; $^1$H NMR (300 MHz) (CDCl$_3$) δ (ppm): 7.3 (m, 3H), 7.1 (m, 1H), 6.0 (s, 5H), 3.5 (sept, 2H), 2.3 (s, 3H), 1.7 (d, 3H), 1.6 (d, 3H), 1.1 (d, 3H), 1.0 (d, 3H) and $^{13}$C-NMR (75.5 MHz) (CDCl$_3$) δ (ppm) 166.5, 137.7, 134.3, 131.5, 129.6, 126.6, 124.9, 115.9, 53.3, 49.2, 20.9, 20.8, 20.6, 19.5.

Synthesis of Ligand N,N-dicyclohexylbenzamidine

Dicyclohexylamine (18.1 g, 0.100 mol) was dissolved in diethylether (150 mL). The solution was heated to reflux temperature and a solution of methylmagnesiumbromide (34 mL, 3.0M in diethylether, 0.10 mol) was added dropwise over a period of 20 minutes. After the addition, the reaction mixture was stirred for 4 hours at room temperature. Benzonitrile (10.3 g, 0.100 mol) was added and the reaction mixture was stirred for 20 hours at room temperature. A solution of ammoniumchloride (10 wt % in water, 100 mL) was added. The water and organic layers were separated and the water layer was extracted twice with diethylether (150 mL). The combined diethyl layers were dried over Na$_2$SO$_4$, filtered and the solvent was evaporated from the filtrate resulting in a yellow wax (23.6 g). The product was further purified by short path distillation (kugelrohr, P=0.8 mbar, T=150° C.). Yield 19.5 g (69%). The product was characterized by $^1$H NMR (300 MHz) (CDCl$_3$) δ (ppm): 7.3 (dd, 3H), 7.2 (dd, 2H), 5.70 (bs, 1H), 3.1 (tt, 2H), 2.0 (bq, 4H), 1.7 (m, 8H), 1.5 (d, 2H), 1.1 (m, 6H) and by $^{13}$C NMR (75 MHz) (CDCl$_3$) δ (ppm): 169.3, 141.9, 128.7, 128.3, 126.2, 58.6, 31.6, 27.0, 25.8.

Synthesis of Me$_5$CpTiCl$_2$((Cy$_2$N)(Ph)C=N) (Compound 19)

Triethylamine (1.5 mL, 1.1 g, 11 mmol) was added to a solution of N,N-dicyclohexylbenzamidine (3.26 g, 11.5 mmol) and Me$_5$CpTiCl$_3$ (2.76 g, 9.5 mmol) in toluene (70 mL). The reaction mixture was stirred at room temperature for 18 hours. The reaction mixture was filtered and the filtrate was dried in vacuo. The residue was washed twice with hexane (50 mL) and the product was dried under reduced pressure. The product 4.34 g (85%) was obtained as a bright orange powder. The powder was characterized by $^1$H NMR (300 MHz) (CDCl$_3$) δ (ppm): 7.3 (m, 1H), 7.0 (t, 2H), 3.3 (bt, 2H), 2.6 (bs, 2H), 1.8 (s, 15H), 1.6-0.8 (bm, 18H) and by $^{13}$C NMR (75 MHz) (CDCl$_3$) δ (ppm): 166.1, 138.1, 129.0, 128.6, 127.2, 127.0, 61.6 (b), 58.7 (b), 32.1 (b), 30.1 (b), 26.8 (b), 26.1 (b), 25.4 (b), 25.0 (b), 12.8.

Synthesis of $^n$BuCpTiCl$_2$(($^i$Pr$_2$N)(2,6-F$_2$Ph)C=N) (Compound 15)

n-BuCpTiCl$_3$ was prepared as described in *Macromolecules*, 2000, 33, 2796.
Triethylamine (0.26 g, 2.6 mmol) was added to a solution of n-BuCpTiCl$_3$ (0.63 g, 2.3 mmol) and N,N-diisopropyl-2,6-difluorobenzamidine (0.55 g, 2.3 mmol) in toluene (10 mL). The reaction mixture was stirred for 18 hours at room temperature. The reaction mixture was filtered and rinsed twice with toluene (10 mL). The solvents of the combined organic phases and the solvent were removed in vacuo. The residue was flushed with diethyl ether leaving the product as a yellow-orange powder. Yield 0.94 g (85%).

These powder was characterized by $^1$H NMR (300 MHz) (CDCl$_3$) δ (ppm): 7.3 (sept, 1H), 6.9 (dd, 2H), 6.1 (s, 4H), 3.6 (dsept, 2H), 2.4 (t, 2H), 1.6 (d, 6H), 1.4 (sept, 2H), 1.2 (m, 2H), 1.1 (d, 6H), 0.8 (t, 3H), by $^{13}$C NMR (75 MHz) (CDCl$_3$) δ (ppm): 154.1 (dd, J=240 Hz and J=8 Hz) 152.6, 134.6, 128.8 (d, J=52.5 Hz), 129.0, 114.4, 113.4, 110.4, 110.2, 51.8, 47.1, 30.7, 28.5, 20.7, 8.8, 18.6, 12.1 and by $^{19}$F NMR (282 MHz) (CDCl$_3$) δ (ppm): −113.4 (s).

Synthesis of C$_6$F$_5$CpTiCl$_2$(($^i$Pr$_2$N)(2,6-F$_2$Ph)C=N) (Compound 16)

Pentafluorophenylcyclopentadienyltitaniumtrichloride was prepared as described in J. Organomet. Chem., 2000, 599, 107.
Pentafluorophenylcyclopentadienyltitaniumtrichloride (0.79 g, 2.0 mmol) and N,N-diisopropyl-2,6-difluorobenzamidine (0.49 g, 2.0 mmol) were dissolved in toluene (10 mL). Triethylamine (0.21 g, 2.1 mmol) was added and the reaction mixture was stirred at room temperature for 18 hours. The reaction mixture was filtered and the filtrate was stored at −20° for 24 hours resulting in 1.04 g (88%) of bright yellow crystals. The crystals were characterized by $^1$H NMR (300 MHz) (CDCl$_3$) δ (ppm): 7.3 (pent, 1H), 7.0 (dd, 2H), 6.7 (m, 2H), 6.3 (dd, 2H), 3.7 (m, 1H), 3.6 (sept, 1H) 1.6 (d, 6H), 1.1 (d, 2H), by $^{13}$C NMR (75 MHz) (CDCl$_3$) δ (ppm): 158.2, (dd, J=248 Hz and J=8 Hz), 155.1, 146.7, 143.4, 142.0, 139.9, 138.6, 136.7 (d, J=5 Hz), 131.7 (d, J=10 Hz), 131.5, 116.0 (d, J=17 Hz), 115.9, 112.7 (m), 112.4 (m), 54.3, 49.8, 20.8, 20.7 and by $^{19}$F NMR (282 MHz) (CDCl$_3$) δ (ppm): −113.6 (s, 2F), −139.1 (dd, 2F), −156.7 (t, 1F), −163.6 (dt, 2F).

Synthesis of IndTiCl$_2$(($^i$Pr$_2$N)(2,6-F$_2$Ph)C=N). (Compound 17)

Indenyltitaniumtrichloride (0.65 g, 2.5 mmol) and N,N-diisopropyl-2,6-difluorobenzamidine (0.60 g, 2.5 mmol) were dissolved in toluene (10 mL). Triethylamine (0.26 g, 2.5 mmol) was added and the reaction mixture was stirred for 18 hours at room temperature. The reaction mixture was filtered and rinsed once with toluene (10 mL). The obtained solution was stored at −80° C. for 24 hours. 0.77 g (65%) of red crystals were obtained. These crystals were characterized by $^1$H NMR (300 MHz) (CDCl$_3$) δ (ppm): 7.5 (dd, 2H), 7.3 (pent, 1H), 7.2 (dd, 2H), 7.0 (dd, 2H), 6.5 (t, 2H), 6.3 (d, 2H), 3.6 (sept, 2H), 1.6 (d, 6H), 1.2 (d, 2H), and by $^{19}$F NMR (282 MHz) (CDCl$_3$) δ (ppm): −113.3.

Synthesis of N,N-dicyclohexyl-2,6-difluorobenzamidine

Dicyclohexylamine (9.06 g, 50.1 mmol) was dissolved in toluene (125 mL). The solution was warmed to 50° C. and a solution of methylmagnesiumbromide was added (16.7 mL, 3.0 M in diethylether, 50.1 mmol) and the reaction mixture was stirred for 2 hours at 50° C. The mixture was cooled to 0° C. and 2,6-difluorobenzonitrile (6.80 g, 48.9 mmol). After 45 hours, the reaction mixture was quenched with a solution of ammoniumchloride in water (3.0 g in 80 mL). The water and organic phases were separated and the water layer was extracted 3 times with diethylether (40 mL). The combined organic solutions were dried over sodium sulphate. The sodium sulphate was filtered off and the filtrate was evaporated to dryness yielding 14.2 g (89%) of the product. The product was characterized by $^1$H NMR (300 MHz) (CDCl$_3$) δ (ppm): 7.2 (pent, 1H), 6.8 (dd, 2H), 5.9 (bs, 1H), 3.5-2.3 (bm, 3H), 1.9-0.6 (bm, 19H), by $^{13}$C NMR (75 MHz) (CDCl$_3$) δ

(ppm): 158.9 (dd, J=248 Hz, J=8 Hz) 156.4, 130.1, 130.0, 129.8, 118.8, 118.4, 118.1, 12.1, 111.7, 61.3 (bs), 56.9 (bs), 32.0 (bs), 30.1 (bs), 26.8 (bs), 25.8 and by $^{19}$F NMR (282 MHz) (CDCl$_3$) δ (ppm): –114.3 (s).

Synthesis of Me$_5$CPTiCl$_2$(Cy$_2$N)(2,6-F$_2$Ph)C=N) (Compound 18)

Triethylamine (0.25 g, 2.5 mmol) was added to a solution of N,N-dicyclohexyl-2,6-difluorobenzamidine (0.79 g, 2.5 mmol) and Me$_5$CpTiCl$_3$ (0.72 g, 2.5 mmol) in toluene (10 mL). The reaction mixture was stirred at room temperature for 18 hours.

The reaction mixture was filtered and the volume of the filtrate was reduced under reduced pressure until the clear solution became cloudy.

Next hexane (10 mL) was added and the mixture was stored at –20° C. for 24 hours. The solvent was decanted from the crystallized product and the product dried under reduced pressure, giving 1.0 g (72%) product. This product was characterized by $^1$H NMR (300 MHz) (CDCl$_3$) δ (ppm): 7.5 (dd, 2H), 7.3 (m, 1H), 7.2 (dd, 2H), 7.0 (t, 2H), 6.5 (t, 2H), 6.3 (d, 2H), 3.6 (m, 2H), 1.6 (d, 6H), 1.2 (d, 2H), by $^{13}$C NMR (75 MHz) (CDCl$_3$) δ (ppm): 158.5 (dd, J=248 Hz and J=8 Hz), 153.8, 130.5, 130.3, 130.2, 127.7, 115.3 (d, J=24 Hz), 112.0 (dd, J=23 Hz and J=2 Hz), 58.7, 32.0 (bs), 30.4 (bs), 26.7, 26.4 (bs), 25.5, 25.2 (bs) and by $^{19}$F NMR (282 MHz) (CDCl$_3$) δ (ppm): –108.1 (s).

Part II. Batch EP Copolymerisation Examples and Comparative Experiments

The batch copolymerizations were carried out in a 2-liter batch autoclave equipped with a double intermig and baffles. The reaction temperature was set on 90° C. and controlled by a Lauda Thermostat. The feed streams (solvents and monomers) were purified by contacting with various absorption media to remove catalyst killing impurities such as water, oxygen and polar compounds as is known to those skilled in the art. During polymerisation the ethylene and propylene monomers were continuously fed to the gas cap of the reactor. The pressure of the reactor was kept constant by a back-pressure valve.

In an inert atmosphere of nitrogen, the reactor was filled with 950 ml solvent, MAO-10T (Crompton 10 wt % in toluene), 4-methyl-2,6-di-tert-butylphenol (BHT). The reactor was heated to 90° C., while stirring at 1350 rpm. The reactor was pressurized to 7 barg and conditioned under a determined ratio of ethylene and propylene for 15 minutes. Next, the catalyst components were added to the reactor and the catalyst vessel was rinsed with 50 mL pentamethylheptane (PMH) subsequently. When tritylium tetrakis(perfluorophenyl)borate (THF20) was used; the THF20 was added directly after the catalyst was added. After 10 minutes of polymerisation, the monomer flow was stopped, and the solution was carefully dumped in a 2 L Erlenmeyer flask, containing a solution of Irganox-1076 in iso-propanol and dried over night at 100° C. under reduced pressure.

The polymers were analysed for intrinsic viscosity (IV), for molecular weight distribution (SEC-DV) and composition (FT-IR).

The experimental conditions and results are given in tables 1 and 2 for the Examples 1 to 24 and in tables 3 and 4 for the Comparative Experiments II-A through II-D respectively.

TABLE 1

| Example | Metal-organic Compound | Activator system | Al/Ti Molar ratio | BHT/Al Molar ratio | Metal-organic compound dosage (μmol) | C3 feed to reactor (NL/h) | C2 feed to reactor (NL/h) | ΔT (° C.) | Yield (g) |
|---|---|---|---|---|---|---|---|---|---|
| 1 | 1 | MAO | 4500 | 1 | 0.10 | 400 | 200 | 3.7 | 12 |
| 2 | 5 | MAO | 2500 | 0.5 | 0.2 | 400 | 200 | 0.7 | 2.0 |
| 3 | 5 | MAO | 2000 | 1 | 0.2 | 400 | 200 | 0.7 | 2.7 |
| 4 | 5 | MAO | 2250 | 2 | 0.2 | 400 | 200 | 0.6 | 2.5 |
| 5 | 5 | MAO | 2250 | 3 | 0.2 | 400 | 200 | 0.3 | 1.8 |
| 6 | 6 | MAO | 6000 | 2 | 0.05 | 400 | 200 | 1.9 | 8.9 |
| 7 | 6 | MAO | 6000 | 2 | 0.05 | 250 | 250 | 3.1 | 6.5 |
| 10 | 7 | MAO | 3000 | 1 | 0.3 | 400 | 200 | 2.2 | 6.2 |
| 11 | 8 | MAO | 3000 | 2 | 0.1 | 400 | 200 | 1.8 | 6.7 |
| 12 | 8 | MAO | 3000 | 2 | 0.1 | 250 | 250 | 3.0 | 9.2 |
| 13 | 9 | MAO | 2250 | 1 | 0.2 | 400 | 200 | 0.5 | 2.5 |
| 15 | 10 | MAO | 3000 | 2 | 0.1 | 400 | 200 | 4.3 | 18.9 |
| 16 | 10 | MAO | 6000 | 2 | 0.05 | 400 | 200 | 2.9 | 11.8 |
| 17 | 12 | MAO | 6000 | 2 | 0.05 | 400 | 200 | 3.0 | 13.7 |
| 18 | 13 | MAO | 3000 | 2 | 0.15 | 400 | 200 | 2.1 | 8.8 |
| 19 | 14 | MAO | 4500 | 2 | 0.07 | 250 | 250 | 1.5 | 4.8 |
| 20 | 15 | MAO | 3000 | 2 | 0.15 | 400 | 200 | 1.5 | 5.9 |
| 21 | 16 | MAO | 3000 | 2 | 0.15 | 250 | 250 | 1.3 | 5.9 |
| 22 | 17 | MAO | 3000 | 2 | 0.075 | 250 | 250 | 4.1 | 11.6 |
| 23 | 21 | MAO | 3000 | 2 | 0.15 | 250 | 250 | 1.9 | 7.5 |

TABLE 2

| Example | Metal-organic Compound | Residual Ti in polymer (ppm)[1] | Incorporated C2 (wt %) | IV (dl/g) | Mw (kg/mol) | Mz (kg/mol) | Mw/Mn |
|---|---|---|---|---|---|---|---|
| 1 | 1 | 0.4 | 50 | n.d. | 600 | 1000 | 1.8 |
| 2 | 5 | 4.9 | n.d. | n.d. | n.d. | n.d. | n.d. |
| 3 | 5 | 3.5 | n.d. | n.d. | n.d. | n.d. | n.d. |
| 4 | 5 | 3.9 | 57 | 2.15 | 175 | 290 | 2.1 |
| 5 | 5 | 5.3 | n.d. | n.d. | n.d. | n.d. | n.d. |

TABLE 2-continued

| Example | Metal-organic Compound | Residual Ti in polymer (ppm)[1] | Incorporated C2 (wt %) | IV (dl/g) | Mw (kg/mol) | Mz (kg/mol) | Mw/Mn |
|---|---|---|---|---|---|---|---|
| 6 | 6 | 0.3 | 47 | n.d. | n.d. | n.d. | n.d. |
| 7 | 6 | 0.4 | 63 | n.d. | n.d. | n.d. | n.d. |
| 10 | 7 | 2.3 | 43 | n.d. | n.d. | n.d. | n.d. |
| 11 | 8 | 0.7 | n.d. | n.d. | n.d. | n.d. | n.d. |
| 12 | 8 | 0.5 | 59 | n.d. | n.d. | n.d. | n.d. |
| 13 | 9 | 3.8 | 51 | n.d. | n.d. | n.d. | n.d. |
| 15 | 10 | 0.3 | n.d. | n.d. | n.d. | n.d. | n.d. |
| 16 | 10 | 0.2 | 44 | 4.7 | 480 | 730 | 1.9 |
| 17 | 12 | 0.2 | 53 | n.d. | n.d. | n.d. | n.d. |
| 18 | 13 | 0.8 | 49 | n.d. | n.d. | n.d. | n.d. |
| 19 | 14 | 0.7 | 57 | 1.29 | n.d. | n.d. | n.d. |
| 20 | 15 | 1.2 | 44 | n.d. | n.d. | n.d. | n.d. |
| 21 | 16 | 1.2 | 49 | 2.88 | n.d. | n.d. | n.d. |
| 22 | 17 | 0.3 | 57 | 1.60 | n.d. | n.d. | n.d. |
| 23 | 21 | 1.0 | 67 | 2.69 | n.d. | n.d. | n.d. |

[1]Calculated value
n.d. = not determined

TABLE 3

| Example | Metal-organic Compound | Activator system | Al/Ti Molar ratio | BHT/Al Molar ratio | Metal-organic compound dosage (μmol) | C3 feed to reactor (NL/h) | C2 feed to reactor (NL/h) | ΔT (° C.) | Yield (g) |
|---|---|---|---|---|---|---|---|---|---|
| II-A | I-B | MAO | 900 | 1 | 0.5 | 250 | 250 | 0.8 | 4.0 |
| II-B | I-A | MAO/TBF20[1] | 450 | 1 | 0.6 | 400 | 200 | 1.7 | 7.2 |
| II-C | II | MAO | 813 | 1 | 2.6 | 200 | 400 | 1.6 | 5.5 |
| II-D | III | MAO | 900 | 2 | 0.5 | 400 | 200 | 1.3 | 3.8 |

[1]TBF20/Ti (mol/mol) = 2

TABLE 4

| Example | Metal-organic Compound | Residual Ti in polymer (ppm)[1] | Incorporated C2 (wt %) | IV (dl/g) | Mw (kg/mol) | Mz (kg/mol) | Mw/Mn |
|---|---|---|---|---|---|---|---|
| II-A | I-B | 6 | n.d. | n.d. | n.d. | n.d. | n.d. |
| II-B | I-A | 4 | 29 | n.d. | n.d. | n.d. | n.d. |
| II-C | II | 23 | 46 | n.d. | n.d. | n.d. | n.d. |
| II-D | III | 6.4 | 60 | 2.40 | 180 | 300 | 2.0 |

[1]Calculated value

Part III. Batch EPDM Terpolymerisations (General Procedure)

The batch terpolymerizations were carried out in a 2-liter batch autoclave equipped with a double intermig and baffles. The reaction temperature was set on 90° C. and controlled by a Lauda Thermostat. The feed streams (solvents and monomers) were purified by contacting with various absorption media to remove catalyst killing impurities such as water, oxygen and polar compounds as is known to those skilled in the art. During polymerisation the ethylene and propylene monomers were continuously fed to the gas cap of the reactor. The pressure of the reactor was kept constant by a back-pressure valve.

In an inert atmosphere of nitrogen, the reactor was filled with PMH (950 mL), MAO-10T (Crompton, 10 wt % in toluene), BHT, 5-ethylidene-2-norbornene (ENB) (0.7 mL) and 5-vinyl-2-norbonene (VNB) (0.7 mL). The reactor was heated to 90° C., while stirring at 1350 rpm. The reactor was pressurized and conditioned under a determined ratio of ethylene, propylene and hydrogen (0.35 NL/h) After 15 minutes, the catalyst components were added into the reactor and the catalyst vessel was rinsed with PMH (50 mL) subsequently. (When THF20 was used; the borate was added directly after the catalyst was added). After 10 minutes of polymerisation, the monomer flow was stopped and the solution was carefully dumped in an Erlenmeyer flask of 2 L, containing a solution of Irganox-1076 in iso-propanol and dried over night at 100° C. under reduced pressure. The polymers were analysed for intrinsic viscosity (IV), for molecular weight distribution (SEC-DV) and composition (FT-IR).

The experimental conditions and results are given in tables 5 and 6 for the Examples 25 through 63 and in tables 7 and 8 for the Comparative Experiments III-A through III-E respectively.

TABLE 5

| Example | Metal-organic Compound | Activator system | Al/Ti Molar ratio | BHT/Al Molar ratio | Metal-organic compound dosage (μmol) | C3 feed to reactor (NL/h) | C2 feed to reactor (NL/h) | ΔT (° C.) | Yield (g) |
|---|---|---|---|---|---|---|---|---|---|
| 25 | 1 | MAO | 1900 | 1 | 0.24 | 400 | 200 | 2.0 | 7.9 |
| 26 | 1 | MAO/TBF20[1] | 4500 | 1 | 0.10 | 400 | 200 | 2.4 | 7.4 |
| 27 | 2 | MAO | 2700 | 1 | 0.15 | 400 | 200 | 2.2 | 5.4 |
| 28 | 6 | MAO/TBF20[1] | 6000 | 2 | 0.05 | 400 | 200 | 1.3 | 5.3 |
| 29 | 6 | MAO/TBF20[1] | 6000 | 1 | 0.05 | 400 | 200 | 0.8 | 3.4 |
| 30 | 6 | MAO | 3000 | 2 | 0.1 | 400 | 200 | 1.6 | 7.5 |
| 31 | 6 | MAO | 3000 | 2 | 0.1 | 250 | 250 | 2.1 | 6.9 |
| 32 | 7 | MAO | 3000 | 1 | 0.3 | 400 | 200 | 0.5 | 2.6 |
| 33 | 7 | MAO | 3000 | 1 | 0.3 | 250 | 250 | 1.3 | 4.1 |
| 34 | 7 | MAO | 3000 | 2 | 0.3 | 250 | 250 | 1.3 | 2.5 |
| 35 | 7 | MAO/TBF20[1] | 3000 | 1 | 0.3 | 250 | 250 | 1.1 | 4.9 |
| 36 | 8 | MAO | 3000 | 2 | 0.2 | 400 | 200 | 1.0 | 4.5 |
| 37 | 8 | MAO | 3000 | 2 | 0.2 | 250 | 250 | 1.3 | 5.5 |
| 39 | 10 | MAO | 3000 | 2 | 0.1 | 400 | 200 | 1.9 | 8.9 |
| 40 | 10 | MAO | 4500 | 2 | 0.1 | 400 | 200 | 1.8 | 8.5 |
| 41 | 10M | MAO | 9000 | 2 | 0.05 | 400 | 200 | 1.5 | 6.8 |
| 42 | 10 | MAO | 4500 | 2 | 0.07 | 250 | 250 | 1.9 | 7.0 |
| 43 | 10 | MAO/TBF20[1] | 4500 | 2 | 0.07 | 250 | 250 | [5] | [5] |
| 44 | 11 | MAO | 4500 | 2 | 0.07 | 250 | 250 | 3.9 | 13.5 |
| 45 | 12 | MAO | 3000 | 2 | 0.1 | 400 | 200 | 2.5 | 10.1 |
| 46 | 13 | MAO | 3000 | 2 | 0.3 | 400 | 200 | 0.6 | 3.1 |
| 47 | 13 | MAO | 3000 | 2 | 0.3 | 250 | 250 | 1.1 | 5.2 |
| 48 | 14 | MAO | 3000 | 2 | 0.12 | 250 | 250 | 0.3 | 2.0 |
| 49 | 15 | MAO | 3000 | 2 | 0.3 | 400 | 200 | 0.7 | 3.8 |
| 50 | 15 | MAO | 3000 | 2 | 0.3 | 250 | 250 | 0.9 | 4.8 |
| 51 | 16 | MAO | 3000 | 2 | 0.15 | 250 | 250 | 0.4 | 1.7 |
| 52 | 16 | MAO/TBF20[1] | 3000 | 2 | 0.15 | 250 | 250 | 0.6 | 2.9 |
| 53 | 17 | MAO | 3000 | 2 | 0.15 | 250 | 250 | 0.5 | 3.1 |
| 54 | 17 | MAO/TBF20[1] | 3000 | 2 | 0.15 | 250 | 250 | 1.5 | 6.7 |
| 55 | 18 | MAO | 4500 | 2 | 0.07 | 250 | 250 | 3.0 | 11.5 |
| 56[2] | 18 | MAO | 4500 | 2 | 0.07 | 250 | 250 | 5.1 | 18.2 |
| 57[3] | 18 | MAO | 4500 | 2 | 0.07 | 250 | 250 | 2.6 | 7.8 |
| 58[4] | 18 | MAO | 4500 | 2 | 0.1 | 250 | 250 | 2.1 | 7.9 |
| 59 | 19 | MAO | 4500 | 2 | 0.07 | 250 | 250 | 2.0 | 8.9 |
| 60[3] | 19 | MAO | 4500 | 2 | 0.07 | 250 | 250 | 1.6 | 6.0 |
| 61[4] | 19 | MAO | 4500 | 2 | 0.07 | 250 | 250 | 2.7 | 8.9 |
| 62 | 21 | MAO | 3000 | 2 | 0.2 | 250 | 250 | 0.8 | 3.9 |
| 63[2] | 21 | MAO | 3000 | 2 | 0.2 | 250 | 250 | 0.4 | 1.8 |

[1]TBF20/Ti (mol/mol) = 2
[2]EPDM experiment without the use of $H_2$
[3]EPDM experiment with double amount of ENB and VNB added to the reactor
[4]EPDM experiment with double amount of ENB and VNB added to the reactor without the use of $H_2$
[5]With this catalyst dosage the activity was too high, reason for which the experiment was interrupted.

TABLE 6

| Example | Metal-organic Compound | Residual Ti in polymer (ppm)[1] | Incorporated C2 (wt %) | ENB (wt %) | VNB (wt %) | IV (dl/g) | Mw (kg/mol) | Mz (kg/mol) | Mw/Mn |
|---|---|---|---|---|---|---|---|---|---|
| 25 | 1 | 1.5 | 47 | 1.6 | 1.3 | 4.2 | 630 | 2400 | 3.8 |
| 26 | 1 | 0.6 | 52 | 1.8 | 1.3 | 4.0 | 430 | 950 | 2.7 |
| 27 | 2 | 1.3 | 47 | 1.6 | 1.3 | 4.12 | 640 | 2500 | 3.9 |
| 28 | 6 | 0.5 | 46.1 | 1.0 | 0.7 | n.d. | n.d. | n.d. | n.d. |
| 29 | 6 | 0.7 | n.d. | n.d. | n.d. | n.d. | n.d. | n.d. | n.d. |
| 30 | 6 | 0.6 | 45 | 1.1 | 0.7 | n.d. | n.d. | n.d. | n.d. |
| 31 | 6 | 0.7 | 62 | 1.08 | 0.83 | 3.27 | n.d. | n.d. | n.d. |
| 32 | 7 | 5.4 | 44 | 2.8 | 2.0 | 1.54 | n.d. | n.d. | n.d. |
| 33 | 7 | 3.6 | 55 | 2.7 | 2.1 | 1.8 | 320 | 1100 | 3.9 |
| 34 | 7 | 5.8 | 53 | 2.2 | 2.3 | 1.67 | 250 | 730 | 3.3 |
| 35 | 7 | 2.9 | 57 | 2.3 | 2.0 | 1.88 | 210 | 520 | 2.7 |
| 36 | 8 | 2.2 | 43 | 2.8 | 2.0 | n.d. | n.d. | n.d. | n.d. |
| 37 | 8 | 1.7 | 54 | 2.4 | 1.8 | n.d. | n.d. | n.d. | n.d. |
| 39 | 10 | 0.5 | 43 | 1.2 | 0.7 | n.d. | n.d. | n.d. | n.d. |
| 40 | 10 | 0.6 | 42 | 1.1 | 0.7 | n.d. | n.d. | n.d. | n.d. |
| 41 | 10M | 0.4 | 45 | 1.0 | 0.7 | n.d. | n.d. | n.d. | n.d. |
| 42 | 10 | 0.5 | 57 | 1.2 | 0.8 | 3.35 | 370 | 870 | 2.4 |
| 43 | 10 | <<<[2] | n.d. | n.d. | n.d. | n.d. | n.d. | n.d. | n.d. |
| 44 | 11 | 0.3 | 53 | 1.1 | 0.7 | 3.76 | n.d. | n.d. | n.d. |
| 45 | 12 | 0.5 | 52 | 0.8 | 0.5 | n.d. | n.d. | n.d. | n.d. |
| 46 | 13 | 4.7 | 47 | 3.0 | 2.3 | n.d. | n.d. | n.d. | n.d. |

TABLE 6-continued

| Example | Metal-organic Compound | Residual Ti in polymer (ppm)[1] | Incorporated C2 (wt %) | ENB (wt %) | VNB (wt %) | IV (dl/g) | Mw (kg/mol) | Mz (kg/mol) | Mw/Mn |
|---|---|---|---|---|---|---|---|---|---|
| 47 | 13 | 2.8 | 55 | 2.6 | 2.3 | n.d. | n.d. | n.d. | n.d. |
| 48 | 14 | 2.9 | 56 | 2.6 | 2.2 | 1.24 | n.d. | n.d. | n.d. |
| 49 | 15 | 3.8 | 42 | 2.7 | 2.0 | n.d. | n.d. | n.d. | n.d. |
| 50 | 15 | 3.0 | 54 | 2.7 | 2.1 | n.d. | n.d. | n.d. | n.d. |
| 51 | 16 | 4.4 | 46 | 2.0 | 1.6 | 1.90 | n.d. | n.d. | n.d. |
| 52 | 16 | 2.5 | 46 | 2.0 | 1.5 | n.d. | n.d. | n.d. | n.d. |
| 53 | 17 | 2.3 | 56 | 2.4 | 2.1 | 1.50 | n.d. | n.d. | n.d. |
| 54 | 17 | 1.1 | 58 | 2.2 | 1.7 | n.d. | n.d. | n.d. | n.d. |
| 55 | 18 | 0.3 | 56 | 1.1 | 0.7 | 3.44 | 290 | 730 | 2.4 |
| 56 | 18 | 0.2 | 52 | 1.0 | 0.6 | 5.00 | n.d. | n.d. | n.d. |
| 57 | 18 | 0.4 | 52 | 1.9 | 1.2 | 3.18 | n.d. | n.d. | n.d. |
| 58 | 18 | 0.3 | 54 | 1.9 | 1.3 | 5.60 | n.d. | n.d. | n.d. |
| 59 | 19 | 0.4 | 61 | 1.1 | 0.7 | 3.89 | 480 | 7400 | 3.9 |
| 60 | 19 | 0.5 | 59 | 1.9 | 1.3 | 3.45 | n.d. | n.d. | n.d. |
| 61 | 19 | 0.4 | 60 | 1.8 | 1.3 | 8.70 | n.d. | n.d. | n.d. |
| 62 | 21 | 2.4 | 65 | 3.1 | 2.4 | 2.63 | n.d. | n.d. | n.d. |
| 63 | 21 | 5.4 | 63 | 3.5 | 2.7 | 2.77 | n.d. | n.d. | n.d. |

[1]Calculated value
[2]Experiment disrupted because of too high activity
n.d. = not determined

TABLE 7

| Example | Metal-organic Compound | Activator system | Al/Ti Molar ratio | BHT/Al Molar ratio | Metal-organic compound dosage (μmol) | C3 feed to reactor (NL/h) | C2 feed to reactor (NL/h) | ΔT (° C.) | Yield (g) |
|---|---|---|---|---|---|---|---|---|---|
| III-A | I-B | MAO | 333 | 1 | 1.5 | 200 | 400 | 0.6 | 3.5 |
| III-B | I-A | MAO/TBF20 | 450 | 1 | 0.80 | 400 | 200 | 2.8 | 13 |
| III-C[1] | III | MAO | 360 | 2 | 1.25 | 400 | 200 | 1.5 | 3.7 |
| III-D[1] | III | MAO | 720 | 0.5 | 1.25 | 400 | 200 | 0.9 | 3.5 |
| III-E | IV | MAO | 1500 | 1 | 0.40 | 400 | 200 | 2.2 | 6.9 |

[1]0.35 ml of ENB and 0.35 ml of VNB were used instead of 0.7 ml of ENB and 0.7 ml of VNB

TABLE 8

| Example | Metal-organic Compound | Residual Ti in polymer (ppm) | Incorporated C2 (wt %) | Incorporated ENB (wt %) | Incorporated VNB (wt %) | IV (dl/g) | Mw (kg/mol) | Mz (kg/mol) | Mw/Mn |
|---|---|---|---|---|---|---|---|---|---|
| III-A | I-B | 21 | 60 | 0.9 | 0.7 | n.d. | n.d. | n.d. | n.d. |
| III-B | I-A | 2.9 | 28 | 0.5 | 0.4 | n.d. | n.d. | n.d. | n.d. |
| III-C | III | 16 | 57 | 2.6 | 1.8 | n.d. | n.d. | n.d. | n.d. |
| III-D | III | 17 | 56 | 2.6 | 1.7 | n.d. | 470 | 2500 | 5.2 |
| III-E | IV | 2.7 | 50 | 2.1 | 1.3 | 3.6 | 320 | 780 | 2.4 | n.d. = not determined

From the residual Ti in the polymer given in Tables 1-8, it can be concluded that the activity of the catalysts according to the invention is higher than the activity of the known catalysts.

Part IV. Continuous Polymerisations

General Continuous Polymerisation Procedure.

The polymerization was carried out in a solution polymerization reactor with a volume of 3 L. The feed streams were purified by contacting with various absorption media to remove catalyst-killing impurities such as water, oxygen and polar compounds as is known to those skilled in the art.

The process is continuous in all feed streams. Premixed hexane (C6), propene, ethylene, dienes, hydrogen, tri-octyl aluminium (TOA). methylaluminoxane (MAO-30T, available from Crompton, or MMAO7 or PMAO-IP both available from Akzo-Nobel) and the phenol BHT were precooled before being fed to the reactor. The solution containing the metal-organic compound and BF15 or THF20 were fed separately to the reactor. The polymer solution was continuously removed through a discharge line where a solution of Irganox-1076 in iso-propanol was added and subsequently worked-up by continuously steam stripping. EPDM was obtained after batch wise drying of the polymer on a mill. The polymers were analyzed using FT-IR for composition, Mooney viscosity (ML(1+4) 125° C.) and SEC-DV for the molecular weight and molecular weight distribution.

From the tables 9 and 10 it can be concluded that the invented catalysts show a higher productivity and Mooney capability than the reference catalysts.

It can further be concluded that the catalyst of the invention has a high activity, even in the absence of a borate or a borane as activator. Comparative Experiment IV-B in conjunction with the Examples in Table 9 shows that the Mooney capability of the catalyst of the present invention is higher than that of Comparative compound II. Comparing Example IV-4 and Experiment IV-E shows that the activity of the present invention is more than 10 times higher than the activity of the known catalyst.

TABLE 9

| Example | Metal-organic Compound | Cat feed μmol/h | C6 l/h | C2 NL/h | C3 g/h | H2 NL/h | ENB mmol/L C6 | VNB mmol/L C6 | MAO 30T mmol/h |
|---|---|---|---|---|---|---|---|---|---|
| IV-1 | 1-B | 20 | 17.8 | 850 | 1410 | 0.48 | 20.2 | 3.0 | 2.1 |
| IV-2 | 1-B | 45 | 17.8 | 850 | 1380 | 0.54 | 20.4 | 11.3 | 6.0 |
| IV-3 | 10M | 7 | 18.0 | 880 | 1220 | 0.38 | 25.0 | 7.3 | 0 |
| IV-4 | 10M | 5 | 15.0 | 720 | 3480 | 0.18 | 6.1 | 8.4 | 0 |
| IV-5 | 10M | 7 | 15.8 | 790 | 2780 | 0.4 | 0 | 0 | 0 |
| IV-6 | 10M | 26 | 15.2 | 730 | 3220 | 0.41 | 5.9 | 78.5 | 0 |
| IV-7 | 10M | 39 | 18.2 | 900 | 1050 | 0.81 | 34.9 | 24.5 | 0 |
| IV-A | II | 7 | 18.0 | 540 | 960 | 0.28 | 0 | 0 | 0 |
| IV-B | II | 160 | 18.3 | 860 | 500 | 0 | 32.5 | 0 | 0 |
| IV-C | II | 300 | 18.0 | 970 | 650 | 0.48 | 32.4 | 0 | 0 |
| IV-D | II | 11 | 17.7 | 500 | 950 | 0.33 | 27.3 | 0 | 0 |
| IV-E | I | 65 | 17.2 | 870 | 1700 | 0.40 | 69 | 0 | 0 |

| Example | MMA O7 mmol/h | PMAO-IP mmol/h | TOA mmol/h | BHT mmol/h | TBF20 feed mmol/h | BF15 feed mmol/h | Temp °C. (reactor) | Prod rate g/h |
|---|---|---|---|---|---|---|---|---|
| IV-1 | 0 | 0 | 0 | 2.07 | 0.030 | 0 | 91 | 1528 |
| IV-2 | 0 | 0 | 0 | 18.0 | 0 | 0 | 92 | 1545 |
| IV-3 | 0 | 0 | 0.25 | 0 | 0.010 | 0 | 91 | 1467 |
| IV-4 | 3.3 | 0 | 0 | 3.3 | 0.007 | 0 | 90 | 1431 |
| IV-5 | 1.8 | 0 | 0 | 1.8 | 0 | 0 | 90 | 1646 |
| IV-6 | 10.5 | 0 | 0 | 10.5 | 0 | 0 | 91 | 1412 |
| IV-7 | 11.5 | 0 | 0 | 11.4 | 0 | 0 | 91 | 1568 |
| IV-A | 4.3 | 0 | 0 | 2.2 | 0.011 | 0 | 81 | 1427 |
| IV-B | 0 | 17.6 | 0 | 8.9 | 0 | 0.25 | 88 | 1330 |
| IV-C | 112 | 0 | 0 | 56 | 0 | 0 | 81 | 1385 |
| IV-D | 4.3 | 0 | 0 | 2.2 | 0.017 | 0 | 79 | 1369 |
| IV-E | 0 | 0 | 3.1 | 0 | 0.069 | 0 | 80 | 1463 |

TABLE 10

| Example | Wt % C2 | Wt % ENB | Wt % VNB* | ML (1 + 4) 125° C. | MSR | Mw Kg/mol | Mw/Mn | Mz/Mw |
|---|---|---|---|---|---|---|---|---|
| IV-1 | 64.4 | 2.0 | 0.2 | 63 | 0.64 | 250 | 3.5 | 2.9 |
| IV-2 | 62.2 | 2.1 | 1.0 | 64 | 0.56 | 420 | 5.9 | 7.3 |
| IV-3 | 66.4 | 2.0 | 0.5 | 59 | 0.59 | 250 | 2.9 | 2.8 |
| IV-4 | 47.1 | 0.4 | 0.3 | 65 | 0.92 | 270 | 2.5 | 2.1 |
| IV-5 | 50.0 | 0 | 0 | 51 | 1.49 | 160 | 2.0 | 1.7 |
| IV-6 | 49.0 | 0.5 | 2.7 | 90 | 0.38 | 320 | 3.7 | 3.9 |
| IV-7 | 65.9 | 3.1 | 1.8 | 42 | 0.50 | 300 | 63 | 5.4 |
| IV-A | 70.2 | 0 | 0 | 59 | 0.67 | 190 | 2.3 | 1.8 |
| IV-B | 66.2 | 3.4 | 0 | 18 | 0.72 | n.d. | N.d. | n.d. |
| IV-C | 63.6 | 2.8 | 0 | 67 | 0.94 | 200 | 2.1 | 1.7 |
| IV-D | 71.5 | 1.94 | 0 | 64.0 | 0.741 | 195 | 2.2 | 1.7 |
| IV-E | 50.3 | 3.57 | 0 | 57.9 | 1.24 | 250 | 2.1 | 1.9 | n.d. = not determined

Part V. Batch Polymerization Examples

UHMWPE

Polymerization Experiments

The polymerizations were carried out in a 1.5 L batch autoclave equipped with a stirrer and baffles. The reaction temperature was set to 60° C. and regulated with a Lauda Thermostat. The feed streams were purified by contacting with various absorption media to remove catalyst-killing impurities, such as water, oxygen and polar compounds as is known to those skilled in the art. During polymerization the ethylene monomer was continuously fed to the gas cap of the reactor. The pressure of the reactor was kept constant by a back-pressure valve.

In an inert atmosphere of nitrogen, the reactor was filled with 700 mL solvent, MAO-10T (Crompton, 10 wt. % in toluene) and 4-methyl-2,6-di-tert-butylphenol (BHT). The reactor was heated to 60° C., while stirring at 500 rpm. The reactor was pressurized to 7 barg and conditioned for 15 minutes until the pressure and temperature remained constant. Next, the catalyst components were added to the reactor and the catalyst vessel was rinsed with 50 mL pentamethylheptane. After 5 minutes of polymerization, the monomer flow was stopped and the solution was carefully dumped into a 2 L Erlenmeyer flask, containing a solution of Irganox-1076 in iso-propanol. The reactor was cleaned by stirring the reactor for 30 minutes with 750 mL PMH twice at 150° C. All solutions were stabilized with Irganox-1076 in iso-propanol and dried overnight at 100° C. under reduced pressure. The polymers were analyzed using SEC-MALLS for molecular weight distributions and intrinsic viscosity (IV) for viscosity data.

With the present catalyst a new UHMWPE could be produced with a weight average molecular weight of at least 4.000 kg/mol in combination with an $M_w/M_n$ of less than 2.6.

TABLE 11

| Metal-organic Compound | Activator system | Al/Ti ratio | BHT/Al Molar ratio | Metal-organic compound dosage (μmol) | C2 feed to reactor (NL/h) | ΔT (° C.) | Yield (g) | Residual Ti in polymer (ppm)[1] | IV (dl/g) | Mn (kg/mol) | Mw (kg/mol) | Mz (kg/mol) |
|---|---|---|---|---|---|---|---|---|---|---|---|---|
| 11 | MAO | 22500 | 1 | 0.02 | 500 | 1.2 | 2.0 | 0.46 | 29 | 1900 | 4400 | 7200 |
| 1 | MAO | 22500 | 1 | 0.02 | 500 | 0.6 | 1.0 | 0.94 | 26 | 1800 | 4300 | 6900 |

[1]Calculated value

The invention claimed is:

1. Process for the preparation of a polymer comprising at least one aliphatic or aromatic hydrocarbyl $C_{2-20}$ olefin in the presence of an ionic catalyst comprising an organometallic compound, an activator and optionally a scavenger, characterized in that the organometallic compound is a compound according to formula 1:

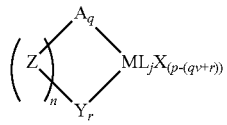

(formula 1)

where:

M is a metal of group 3-13 or the lanthanide series, and p is the valency of the metal M;

A represents a neutral or anionic spectator ligand whose valency v is 0, 1 or 2, and q is an integer denoting the number of spectator ligands A;

Z is an optional bridging moiety, and n is the integer number of parallel bridging moieties Z;

Y is an amidine-containing spectator ligand represented by formula 2:

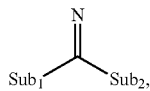

(formula 2)

wherein the amidine-containing ligand is covalently bonded to the metal M via the imine nitrogen atom, $Sub_1$ is a substituent, which comprises a group 14 atom through which $Sub_1$ is bonded to the imine carbon atom, $Sub_2$ is a substituent, which comprises a heteroatom of group 15-16, through which $Sub_2$ is bonded to the imine carbon atom;

r is an integer >0;

L is an optional neutral Lewis basic ligand, and j is an integer denoting the number of neutral ligands L, and X is an anionic ligand that may be independently selected from the group consisting of hydride, halide, alkyl, silyl, germyl, aryl, amide, aryloxy, alkoxy, phosphide, sulfide, acyl, pseudo halides and a combination thereof.

2. Process according to claim 1, wherein the activator is a borate.

3. Process according to claim 1, wherein the polymer is UHMWPE.

4. The process of claim 1 wherein said process is performed in the presence of said ionic catalyst comprising said organometallic compound, said activator and said scavenger.

5. The process of claim 1 wherein said organometallic compound comprises Z which is a bridging moiety.

6. The process of claim 1 wherein said organometallic compound comprises L which is a neutral Lewis basic ligand.

7. Process according to claim 1, wherein the activator is a borane.

8. Process according to claim 1, wherein the activator is an alkylaluminoxane.

9. Process according to claim 1, wherein the polymer is EPDM.

10. The process of claim 1 wherein the pseudo halides are selected from the group consisting of cyanide, azide, acetylacetonate and a combination thereof.

* * * * *